(12) United States Patent
Mitteer et al.

(10) Patent No.: US 12,308,730 B2
(45) Date of Patent: May 20, 2025

(54) ELECTRICAL MOTOR USING A HEAT SPREADER AND CARTRIDGE CONTROL ASSEMBLY

(71) Applicant: GHSP, Inc., Holland, MI (US)

(72) Inventors: David Michael Mitteer, Shelby, MI (US); Ryan David Rosinski, Whitehall, MI (US); Nathaniel Joseph McMackin, New Era, MI (US); Brian Howard Mulder, Grand Haven, MI (US); Joseph Daniel Suchecki, Grand Haven, MI (US)

(73) Assignee: GHSP, Inc., Holland, MI (US)

( * ) Notice: Subject to any disclaimer, the term of this patent is extended or adjusted under 35 U.S.C. 154(b) by 333 days.

(21) Appl. No.: 17/882,677

(22) Filed: Aug. 8, 2022

(65) Prior Publication Data
US 2023/0051452 A1   Feb. 16, 2023

Related U.S. Application Data

(60) Provisional application No. 63/232,772, filed on Aug. 13, 2021.

(51) Int. Cl.
*H02K 9/22*    (2006.01)
*H02K 11/33*   (2016.01)
(Continued)

(52) U.S. Cl.
CPC ............ *H02K 9/227* (2021.01); *H02K 11/33* (2016.01); *H02K 21/16* (2013.01); *F04D 13/06* (2013.01); *H02K 2211/03* (2013.01)

(58) Field of Classification Search
CPC .... H02K 11/30; H02K 11/33; H02K 22/1103; H02K 2203/03; H02K 5/18; H02K 9/227; H02K 9/22; H02K 21/16; H02K 2211/03
See application file for complete search history.

(56) References Cited

U.S. PATENT DOCUMENTS

| | | | |
|---|---|---|---|
| 6,906,544 B1 * | 6/2005 | Shanker et al. | ... G01R 31/2808 324/750.25 |
| 7,037,014 B2 * | 5/2006 | Clayvon et al. | ..... H05K 1/0266 400/613 |

(Continued)

FOREIGN PATENT DOCUMENTS

| | | | | |
|---|---|---|---|---|
| CN | 208128083 U | * | 11/2018 | ............. H02K 11/33 |
| JP | 3612807 B2 | * | 1/2005 | ............... H02K 7/00 |

(Continued)

OTHER PUBLICATIONS worldwide.espacenet.com translation of JP 3612807 B2 (Year: 2005).*

(Continued)

*Primary Examiner* — Jose A Gonzalez Quinones
(74) *Attorney, Agent, or Firm* — Price Heneveld LLP

(57) ABSTRACT

A motor assembly includes a housing having a motor cavity. A stator is disposed within the housing. A rotor rotates within the stator and within the motor cavity about a rotational axis. A controller is coupled with the stator having a filter circuit board and a main circuit board that are interconnected at a terminal header to define a multilayer circuit board assembly. The circuit board assembly has an electrical interface and a data interface attached to at least one of the filter circuit board and the main circuit board.

20 Claims, 20 Drawing Sheets

(51) Int. Cl.
*H02K 21/16* (2006.01)
*F04D 13/06* (2006.01)

(56) References Cited

U.S. PATENT DOCUMENTS

| | | | |
|---|---|---|---|
| 9,587,639 | B2 | 3/2017 | Rosinski et al. |
| 9,587,647 | B2 | 3/2017 | Lee |
| 9,859,772 | B2 | 1/2018 | Bang et al. |
| 2006/0057005 | A1 | 3/2006 | Williams et al. |
| 2012/0087094 | A1* | 4/2012 | Hill et al. ......... H05K 7/20472 361/720 |
| 2012/0112578 | A1* | 5/2012 | Telakowski et al. .... H02K 1/32 310/64 |
| 2014/0265663 | A1* | 9/2014 | Chamberlin et al. .. H02K 9/223 310/59 |
| 2015/0184674 | A1 | 7/2015 | Lee |
| 2015/0211548 | A1 | 7/2015 | Bang et al. |
| 2015/0252808 | A1* | 9/2015 | Rosinski et al. ........ F04D 13/06 417/423.5 |
| 2015/0308435 | A1 | 10/2015 | Rosinski et al. |
| 2018/0170169 | A1* | 6/2018 | Lee et al. ............... H02K 5/203 310/54 |
| 2018/0238348 | A1 | 8/2018 | Pawellek et al. |
| 2019/0207488 | A1* | 7/2019 | Ichikawa et al. ...... H02K 11/30 180/443 |

FOREIGN PATENT DOCUMENTS

| | | | | |
|---|---|---|---|---|
| KR | 20010091951 A | * | 10/2001 | ............... B23K 1/00 |
| KR | 20120015525 A | * | 2/2012 | ......... H02K 11/0094 |
| KR | 20150038629 A | * | 4/2015 | ........... B23K 26/034 |
| WO | WO 9903175 A1 | * | 1/1999 | ............. H01R 33/06 |

OTHER PUBLICATIONS worldwide.espacenet.com translation of CN 208128083 U (Year: 2018).*
worldwide.espacenet.com translation of KR 20010091951 A (Year: 2001).*
PE2E translation of KR 20120015525 A (Year: 2012).*
worldwide.espacenet.com translation of KR 20150038629 A (Year: 2015).*

* cited by examiner

ELECTRICAL MOTOR USING A HEAT SPREADER AND CARTRIDGE CONTROL ASSEMBLY

CROSS-REFERENCE TO RELATED APPLICATION

This application claims priority to and the benefit under 35 U.S.C. § 119(e) of U.S. Provisional Patent Application No. 63/232,772, filed on Aug. 13, 2021, entitled ELECTRICAL MOTOR USING A HEAT SPREADER AND CARTRIDGE CONTROL ASSEMBLY, the entire disclosure of which is hereby incorporated herein by reference.

FIELD OF THE DEVICE

The device is in the field of fluid pumps, and more specifically, a fluid pump that utilizes a heat spreader to remove heat in the device generated by an electrical current having a large amperage for operating the fluid pump, typically within an electric vehicle.

BACKGROUND OF THE DEVICE

Fluid pumps are used to transfer fluid material from a reservoir to a use location, and then back to the reservoir. These fluid pumps can be attached to a serpentine belt, or other rotational component within the engine, or can be a dedicated electrical assembly for operating an electrical motor. These devices can include fluid flow mechanisms for addressing heat related issues within the fluid pump.

SUMMARY OF THE DISCLOSURE

According to a first aspect of the present disclosure, a motor assembly includes a housing having a motor cavity. A stator is disposed within the housing. A rotor rotates within the stator and within the motor cavity about a rotational axis. A controller is coupled with the stator having a filter circuit board and a main circuit board that are interconnected at a terminal header to define a multilayer circuit board assembly. The circuit board assembly has an electrical interface and a data interface attached to at least one of the filter circuit board and the main circuit board.

According to another aspect, a motor assembly includes a wound stator that is overmolded to form a housing having a motor cavity within the stator. A rotor rotates within the motor cavity about a rotational axis. A controller includes a filter circuit board and a main circuit board that are interconnected at a terminal header to define a multilayer circuit board assembly containing electrical surface mount technology electrical sockets for attaching motor terminals in electrical communication with the main circuit board.

According to another aspect, a motor assembly includes a wound stator that is overmolded to form a housing having a motor. A rotor rotates within a motor cavity about a rotational axis. A heat spreader is attached to the housing. The heat spreader includes a heat sink and a hollow shaft that extends into the motor cavity defining the rotational axis. The heat sink draws heat from a circuit board assembly and transfers the heat to a thermal exchange media that is circulated through the motor cavity and the hollow shaft.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
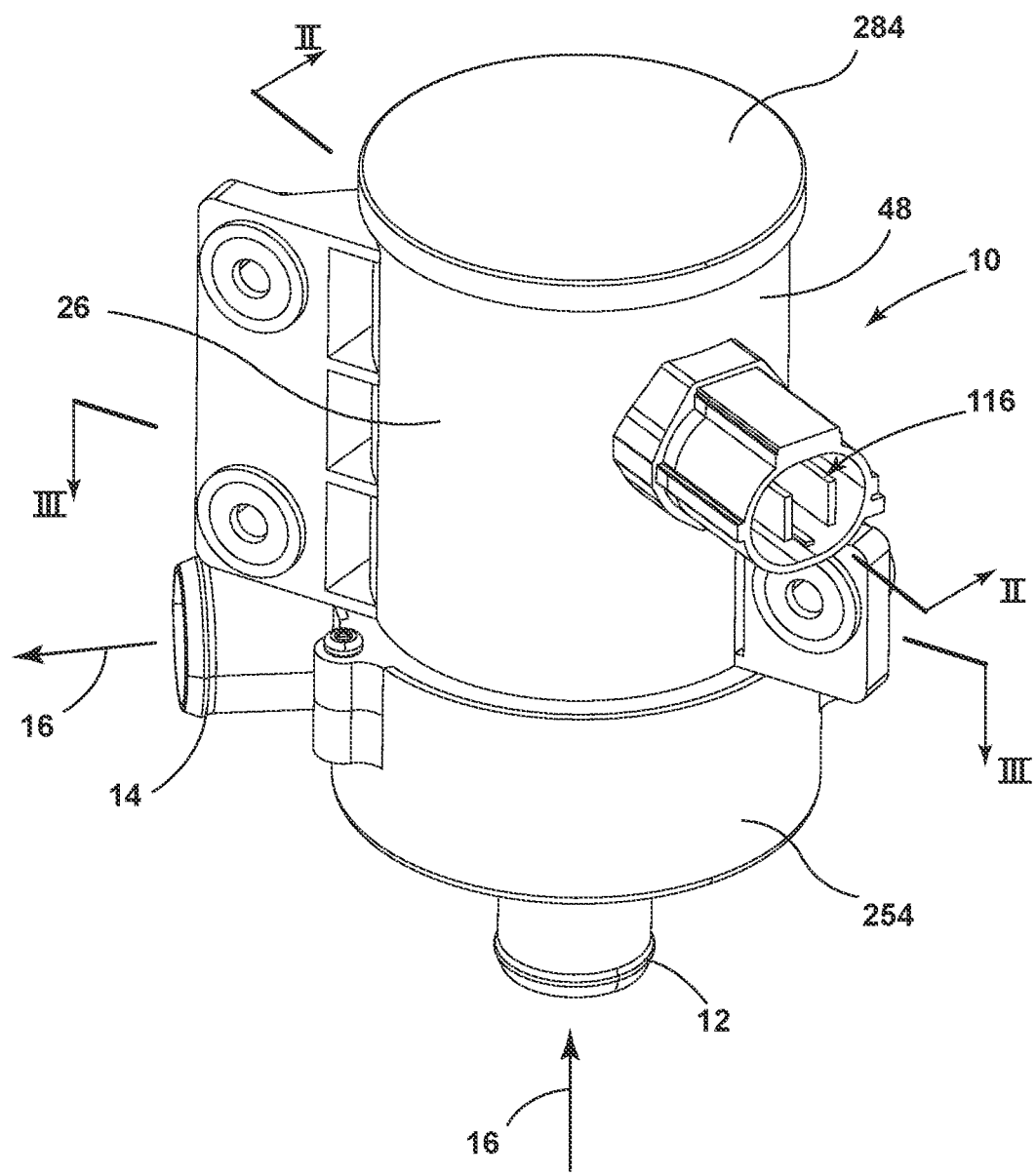
FIG. 1 is a perspective view of an aspect of the fluid pump incorporating an aspect of the circuit board assembly.
Figure 2:
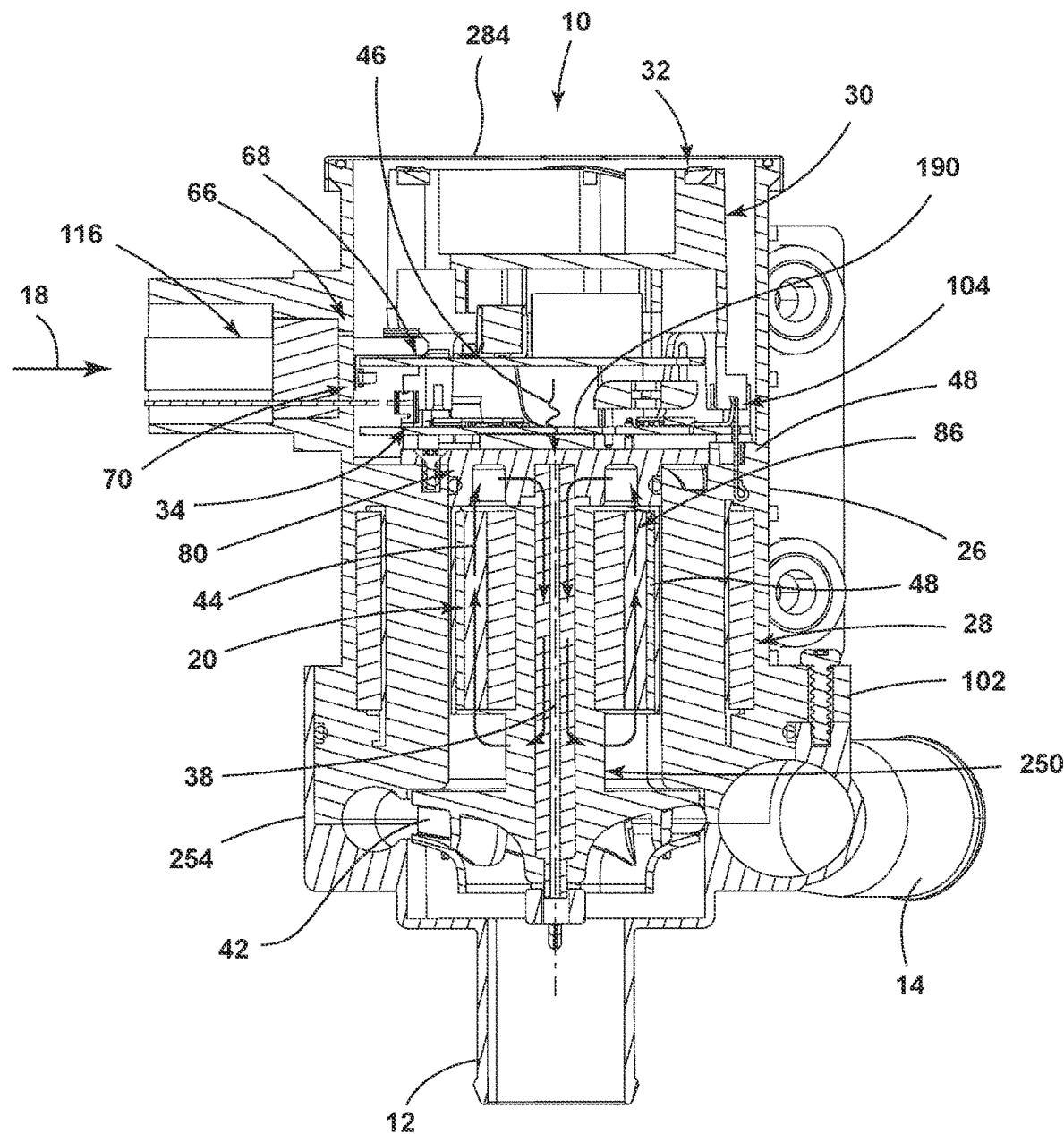
FIG. 2 is a cross-sectional view of the fluid pump of FIG. 1 taken along line II-II.
Figure 3:
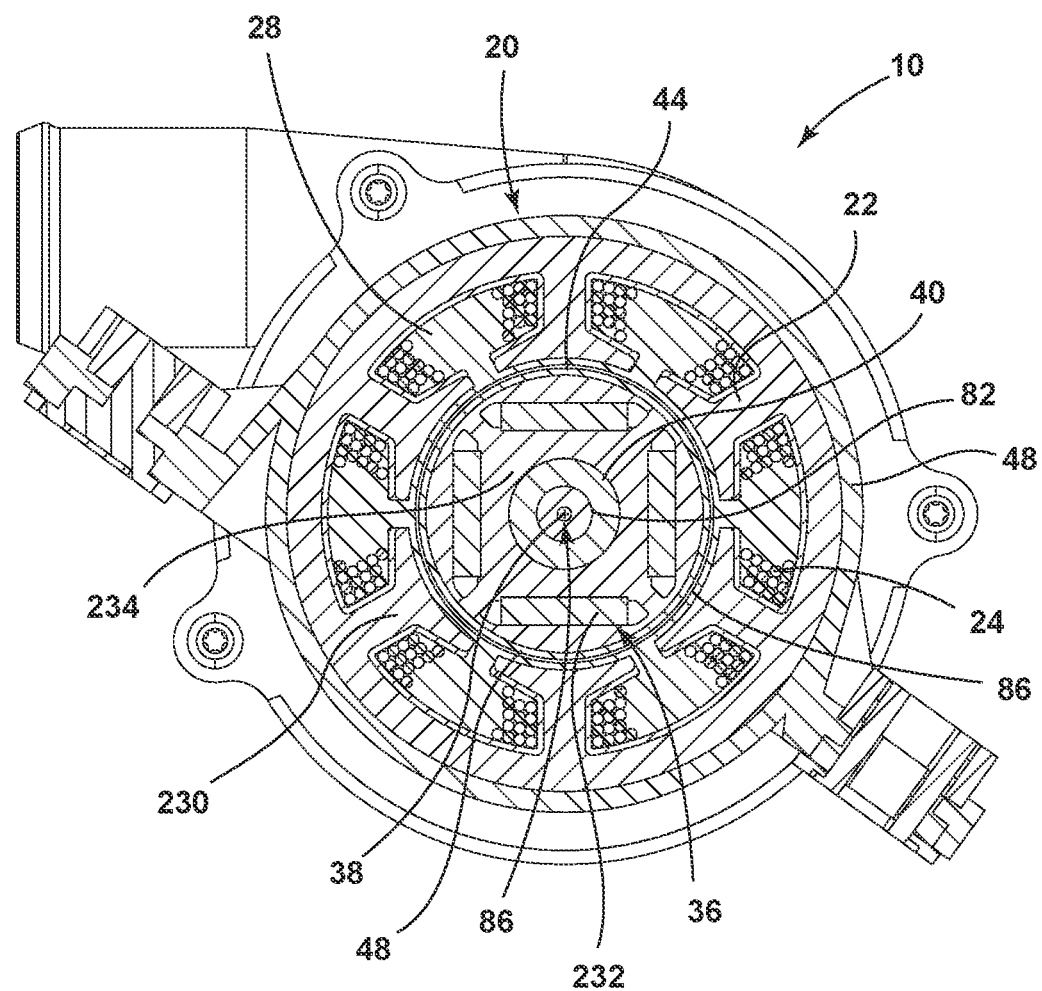
FIG. 3 is a cross-sectional view of the fluid pump of FIG. 1 taken along line III-III.
Figure 4:
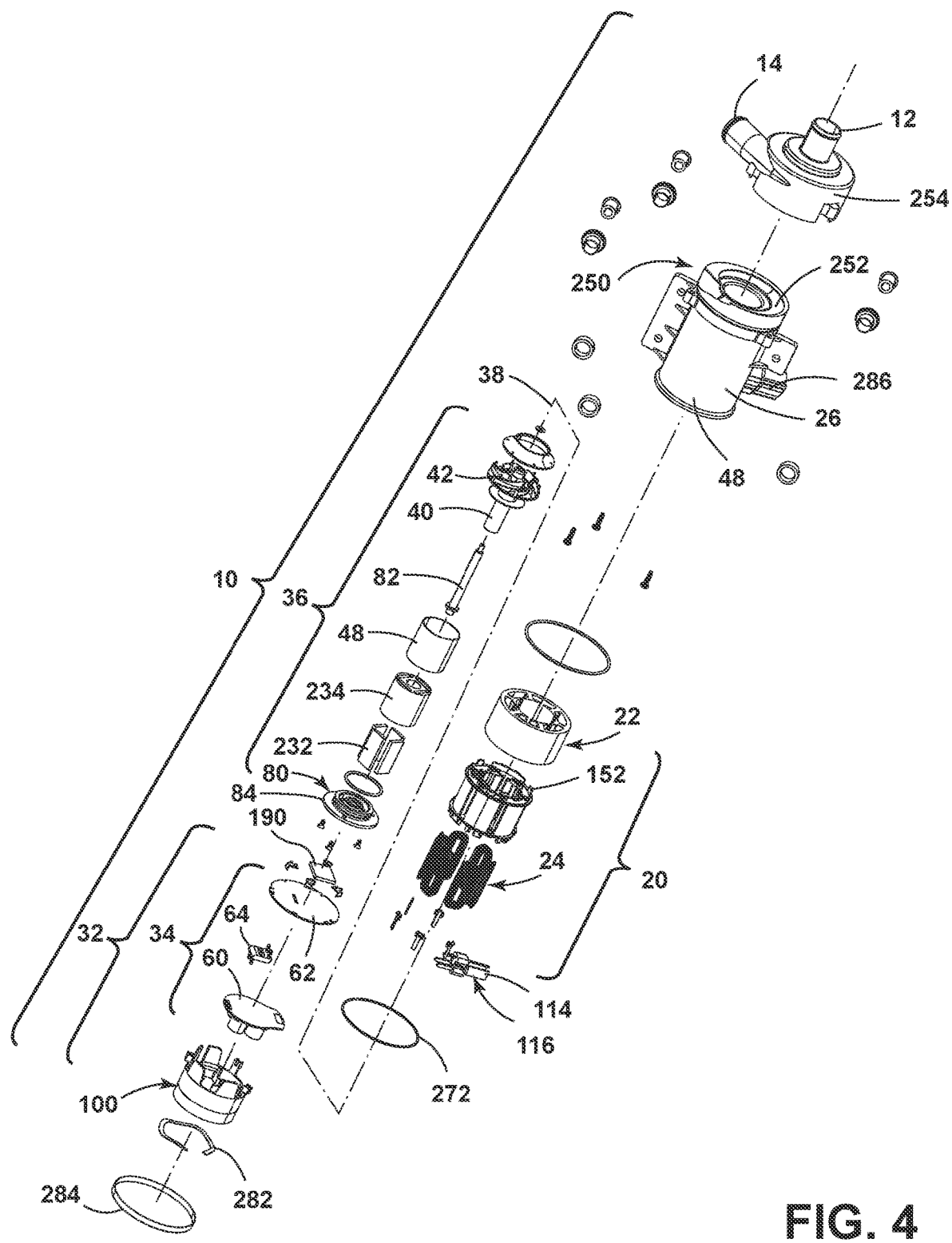
FIG. 4 is an exploded perspective view of the fluid pump of FIG. 1.
Figure 5:
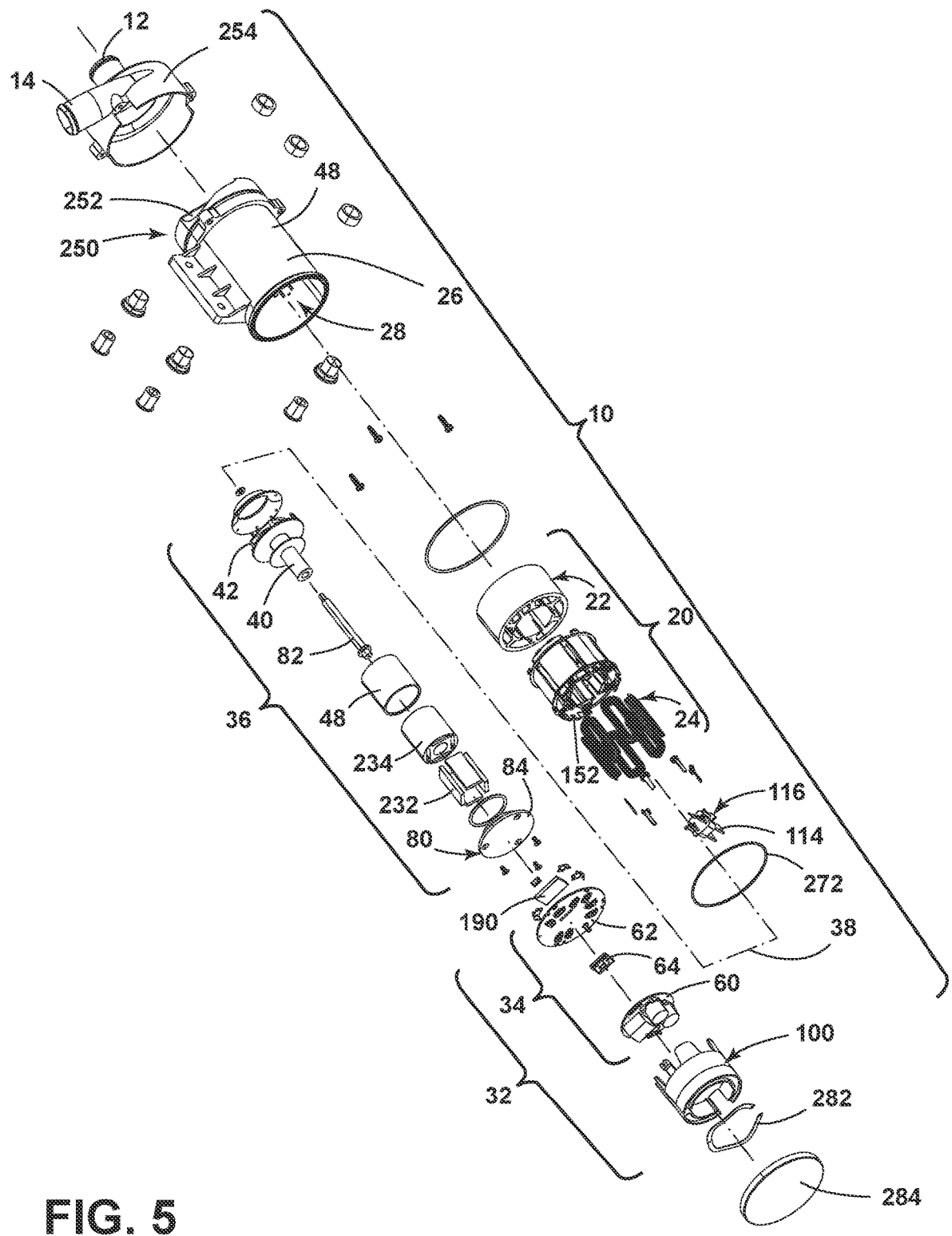
FIG. 5 is another exploded perspective view of the fluid pump of FIG. 1
Figure 6:
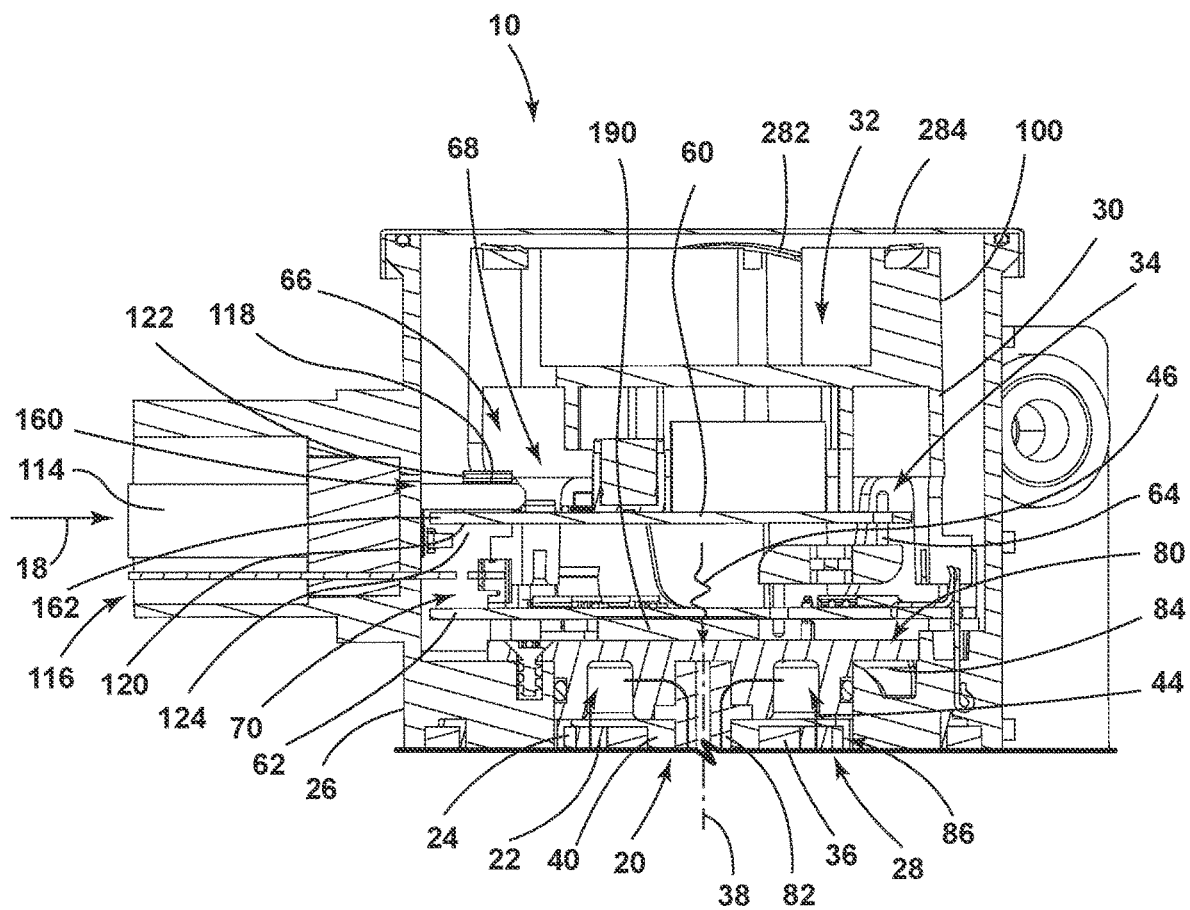
FIG. 6 is an enlarged cross-sectional view of the circuit board assembly and showing engagement of the electrical and data connections with the plurality of the printed circuit boards of the circuit board assembly.
Figure 7:
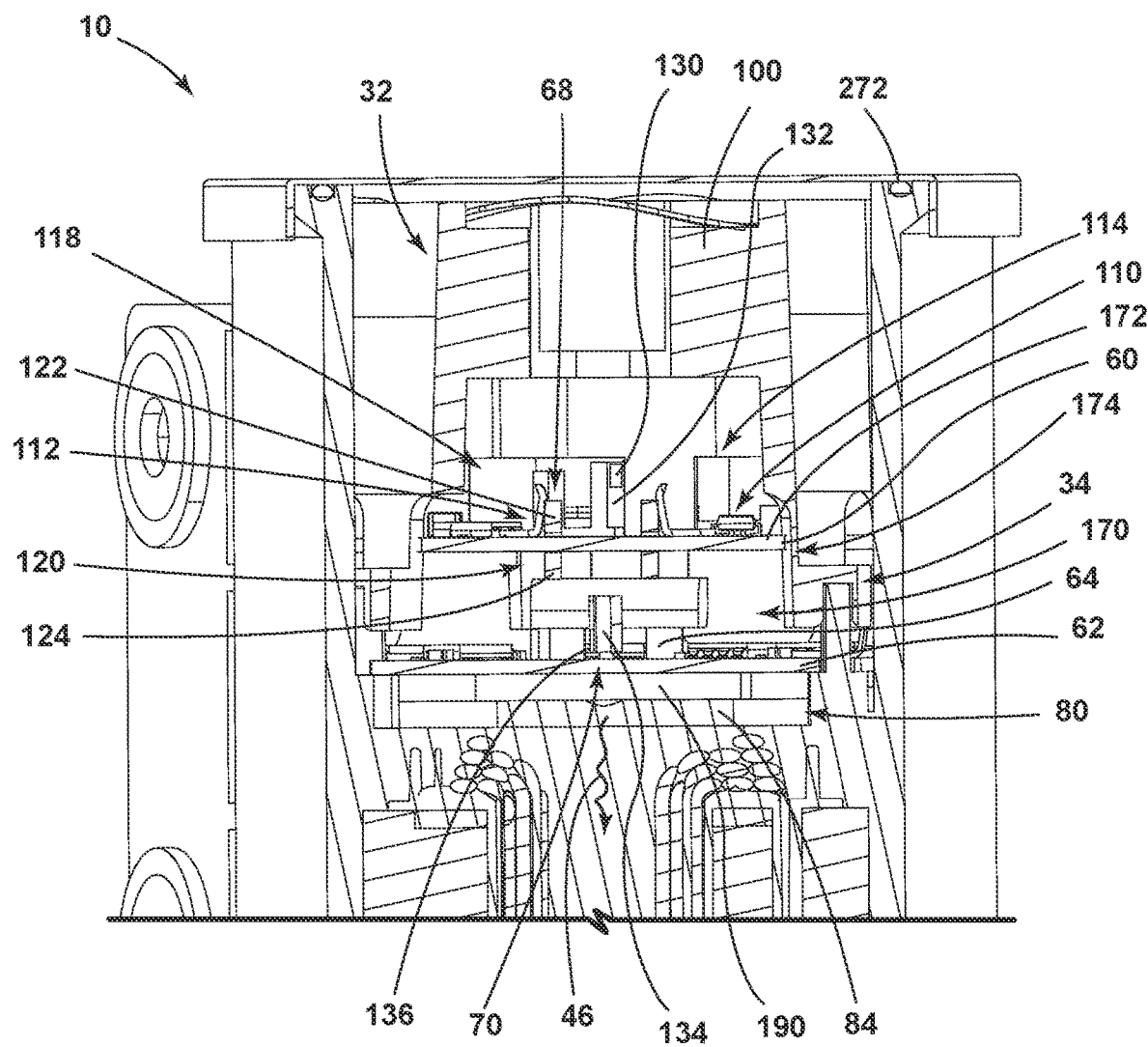
FIG. 7 is an enlarged cross-sectional view of the circuit board assembly and showing engagement of the electrical and data connections therewith.
Figure 8:
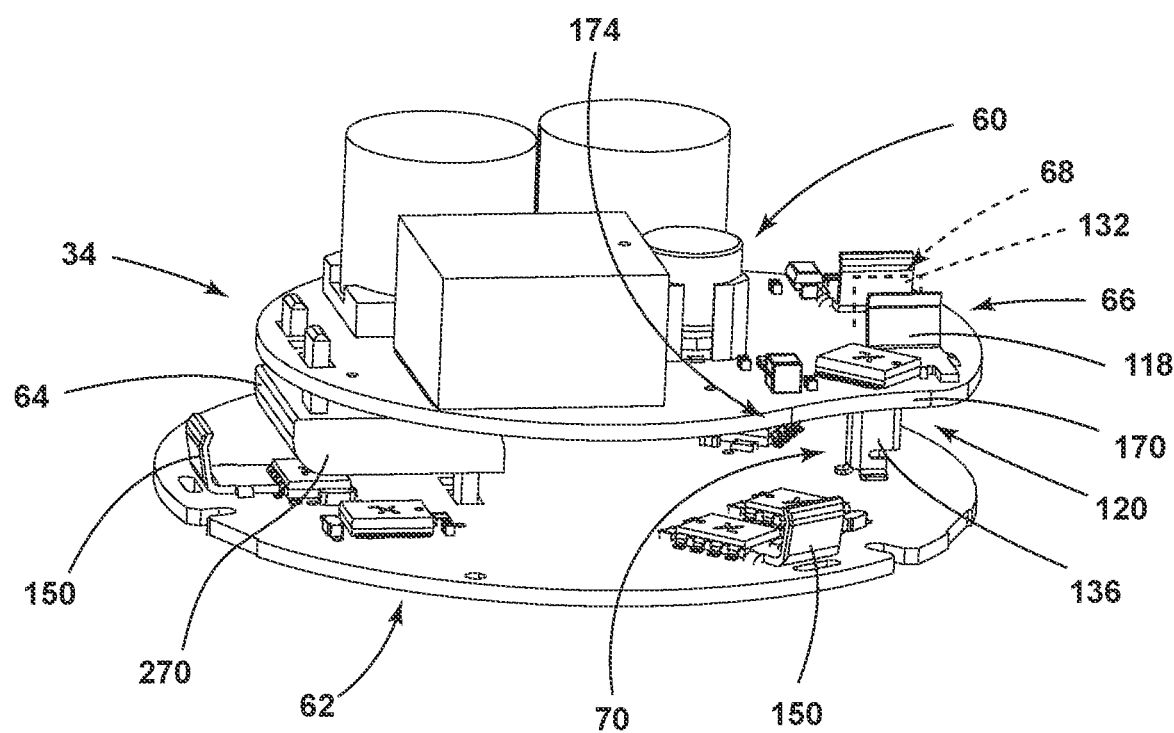
FIG. 8 is an enlarged perspective view of an aspect of the circuit board assembly.
Figure 9:
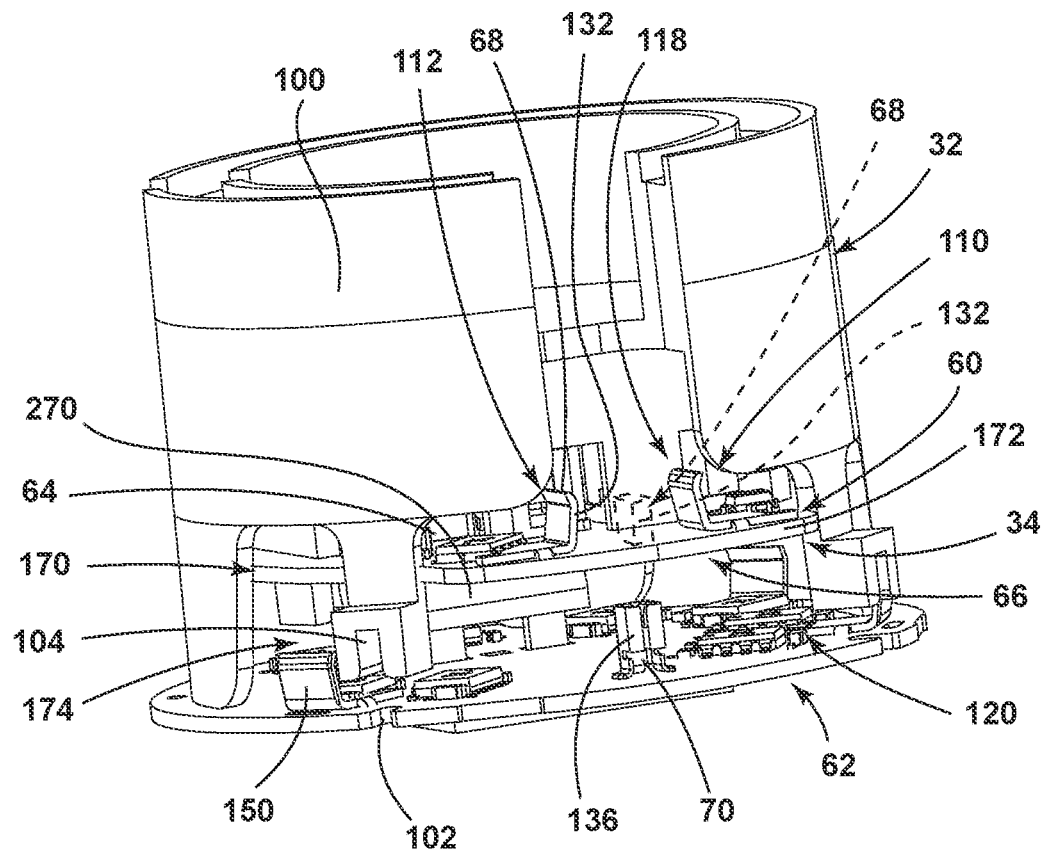
FIG. 9 is a perspective view of an aspect of the controller cartridge that includes the circuit board assembly of FIG. 8.
Figure 10:
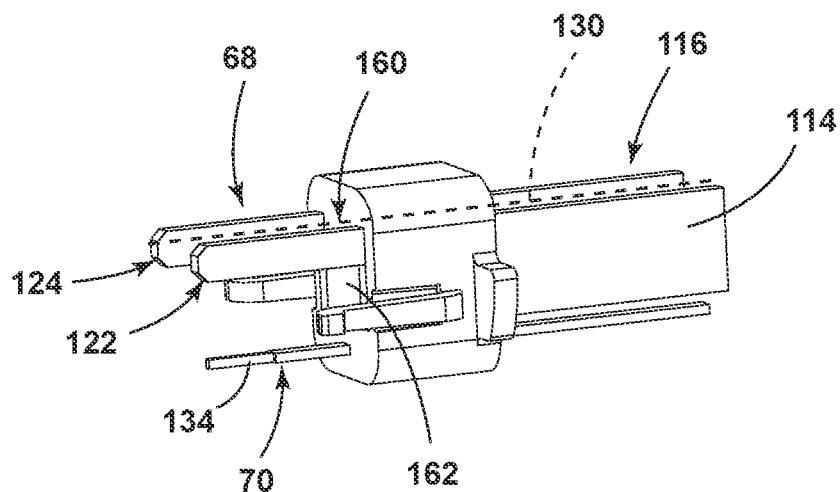
FIG. 10 is a perspective view of a main connector having the blades and the data connectors that engage the circuit board assembly.
Figure 11:
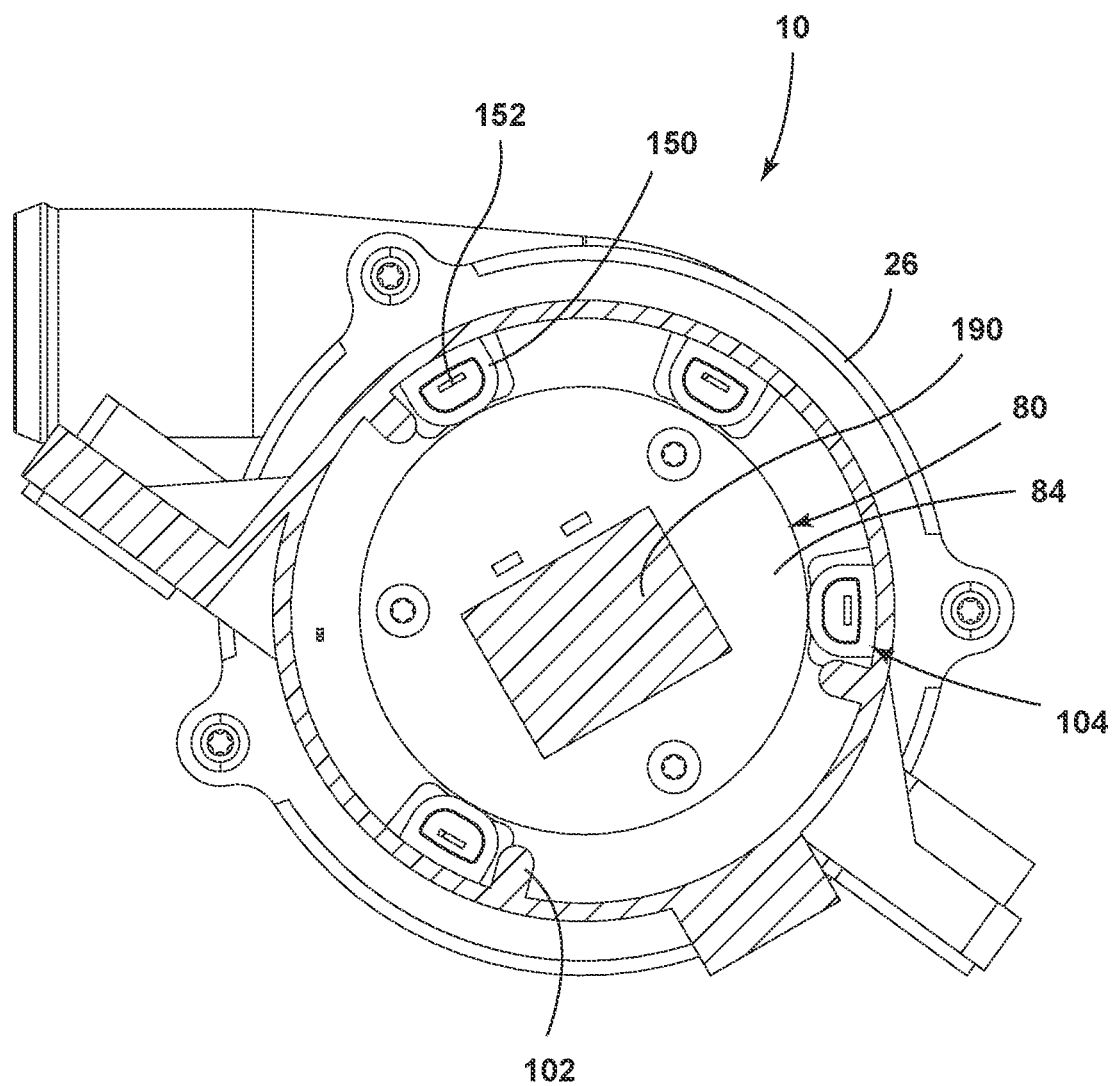
FIG. 11 is a cross-sectional view showing an aspect of the heat spreader positioned within the housing and between the motor cavity and the controller cavity.
Figure 12:
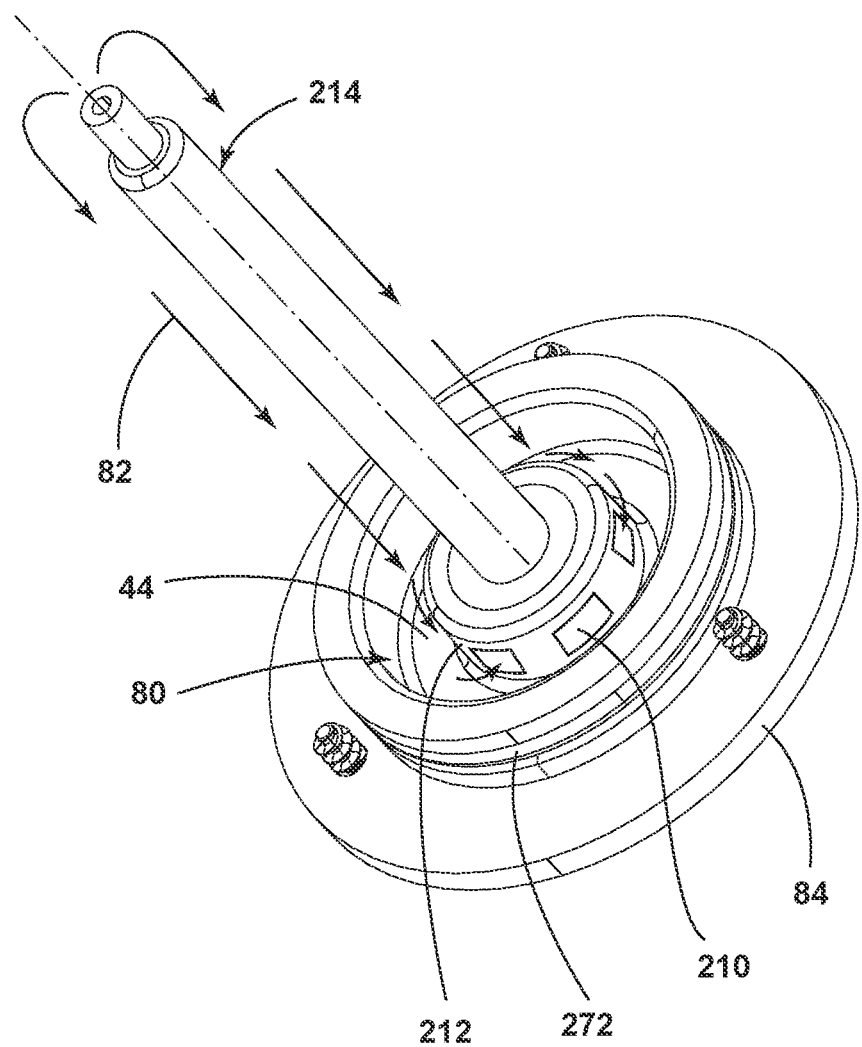
FIG. 12 is a schematic perspective view of an aspect of the heat spreader and showing movement of the heat exchange media therethrough.
Figure 13:
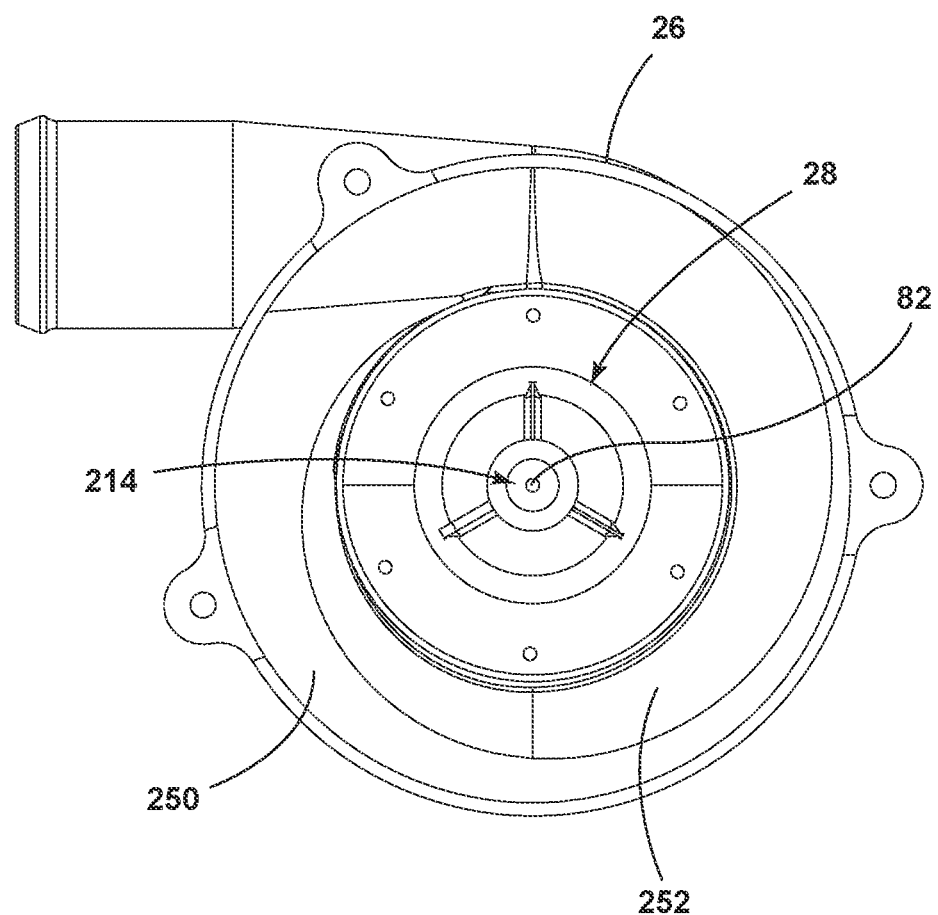
FIG. 13 is a plan view of the centerpole of the heat spreader positioned within the impeller of the fluid pump.
Figure 14:
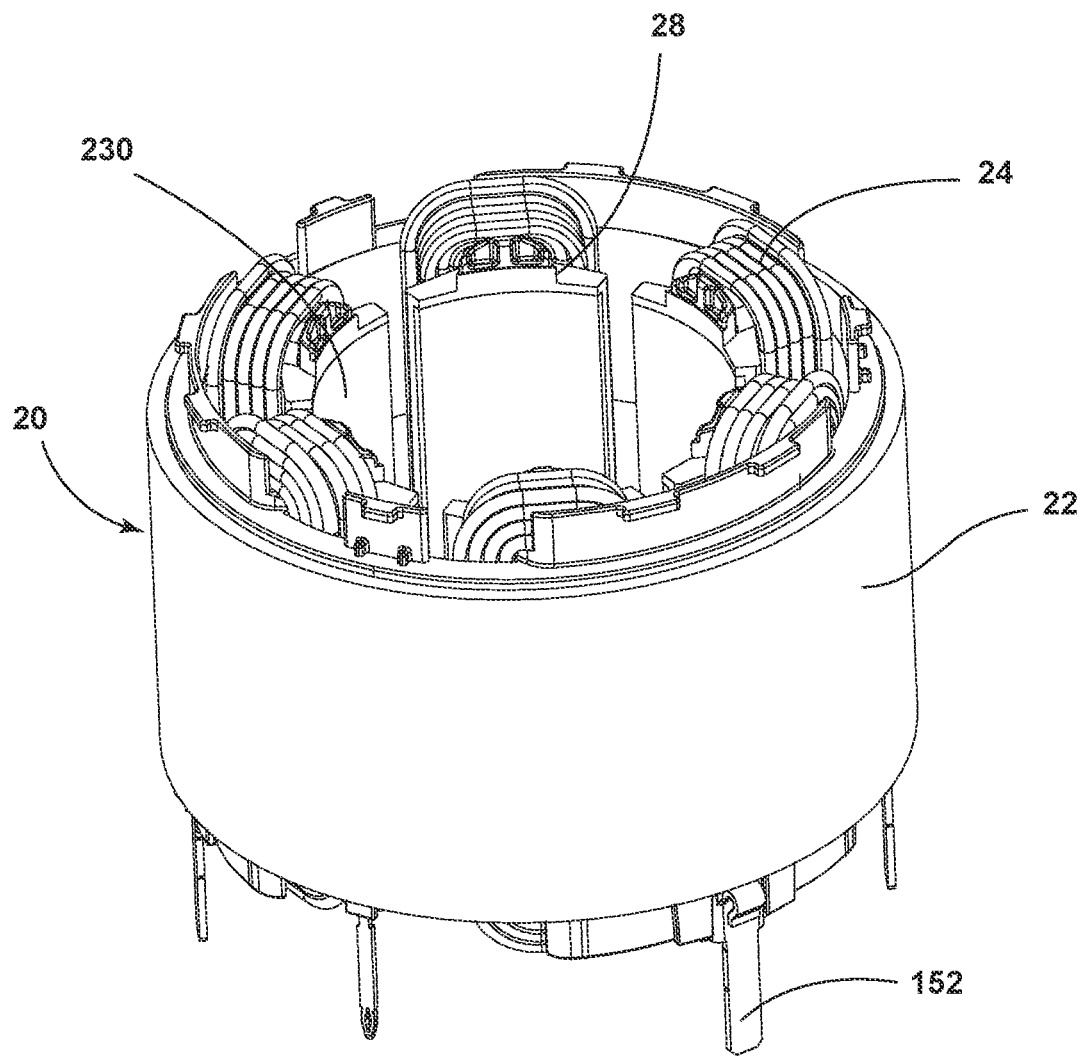
FIG. 14 is a perspective view of the stator used within the fluid pump.
Figure 15:
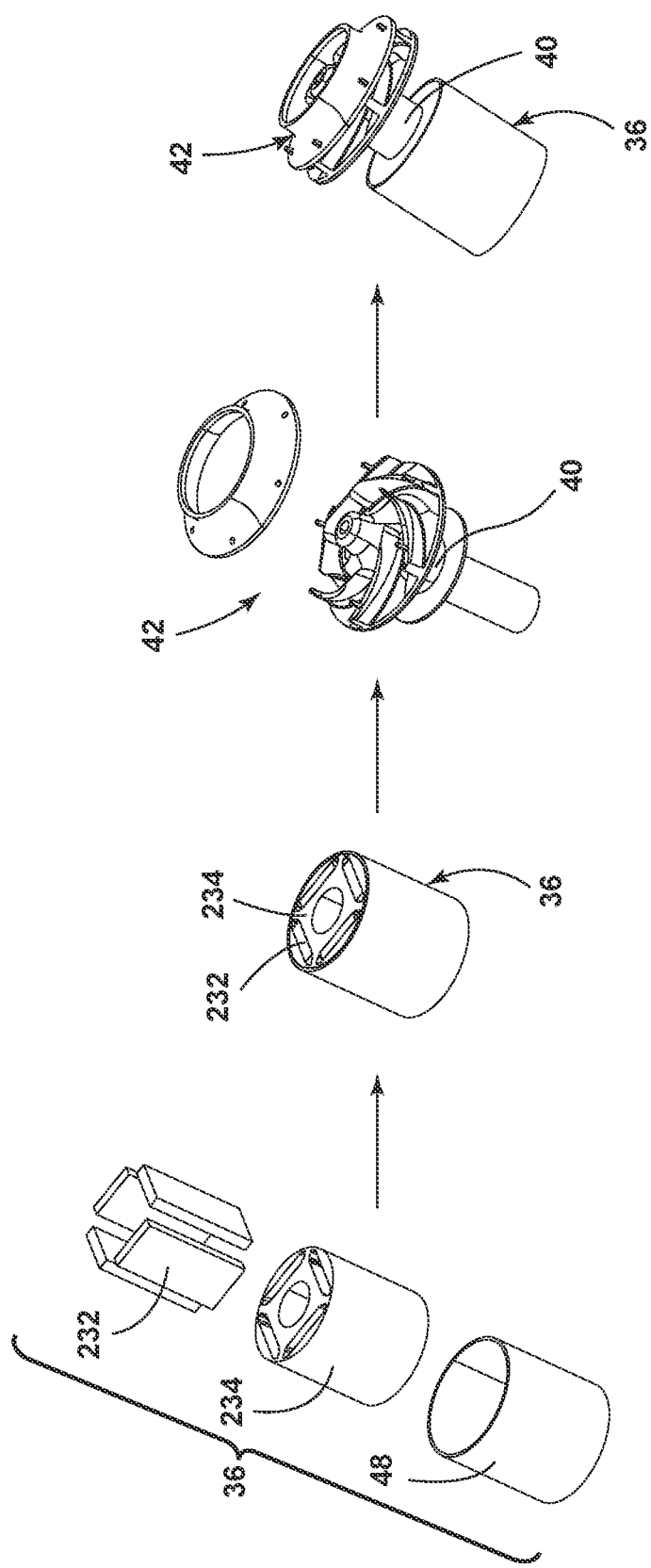
FIG. 15 is a progression of perspective views showing assembly of the rotor and impeller for the fluid pump.
Figure 16:
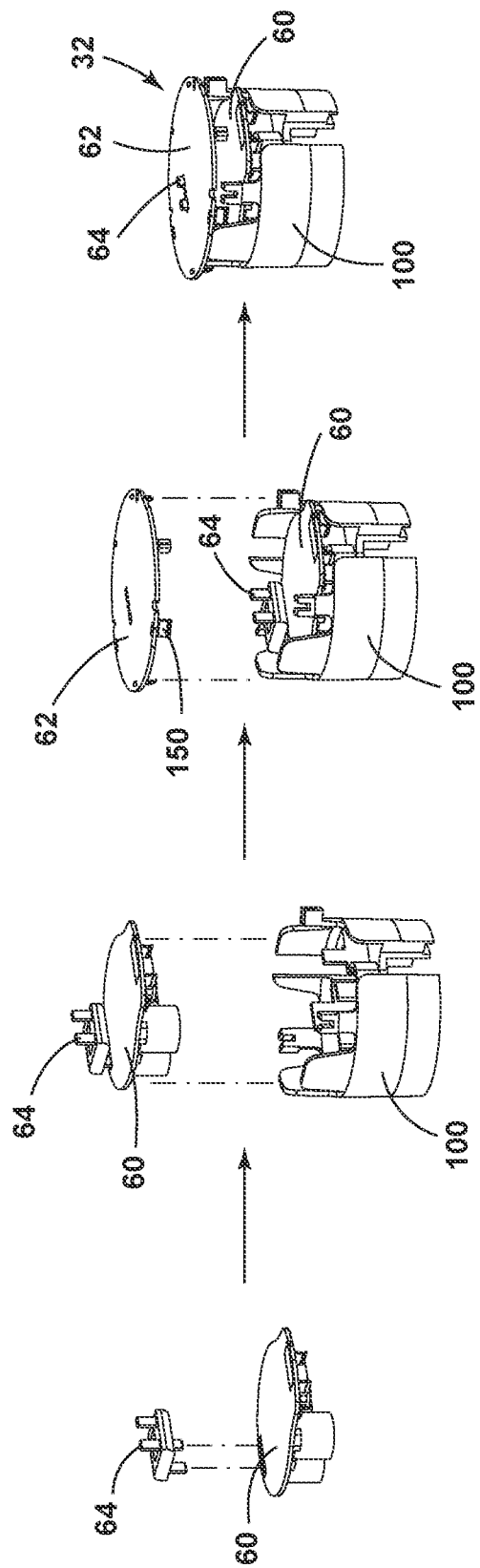
FIG. 16 is a progression of perspective views showing assembly of the circuit board assembly to form the controller cartridge.
Figure 17:
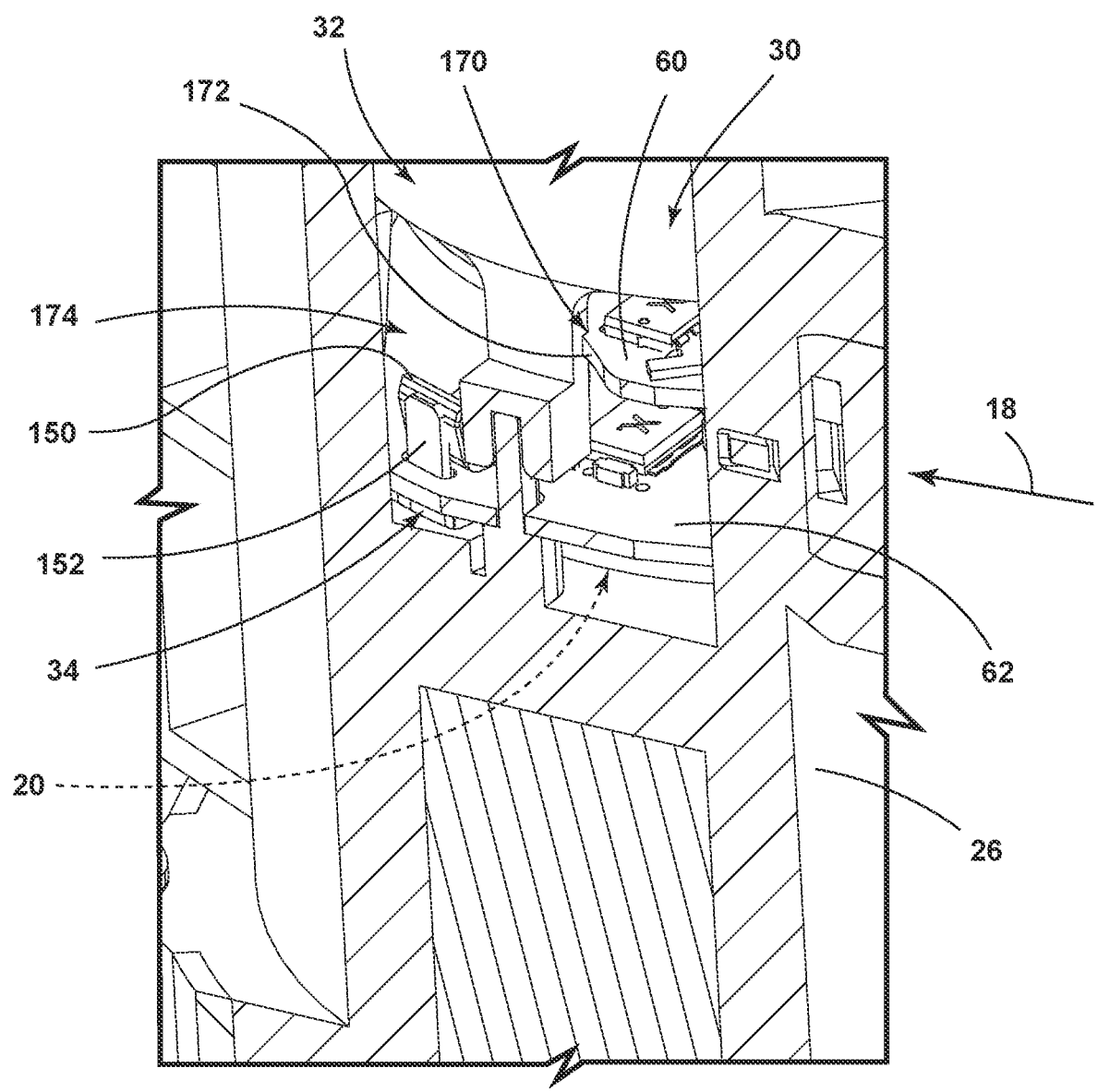
FIG. 17 is a detailed perspective view showing engagement of the housing and the control circuitry for the stator with the circuit board assembly.
Figure 18:
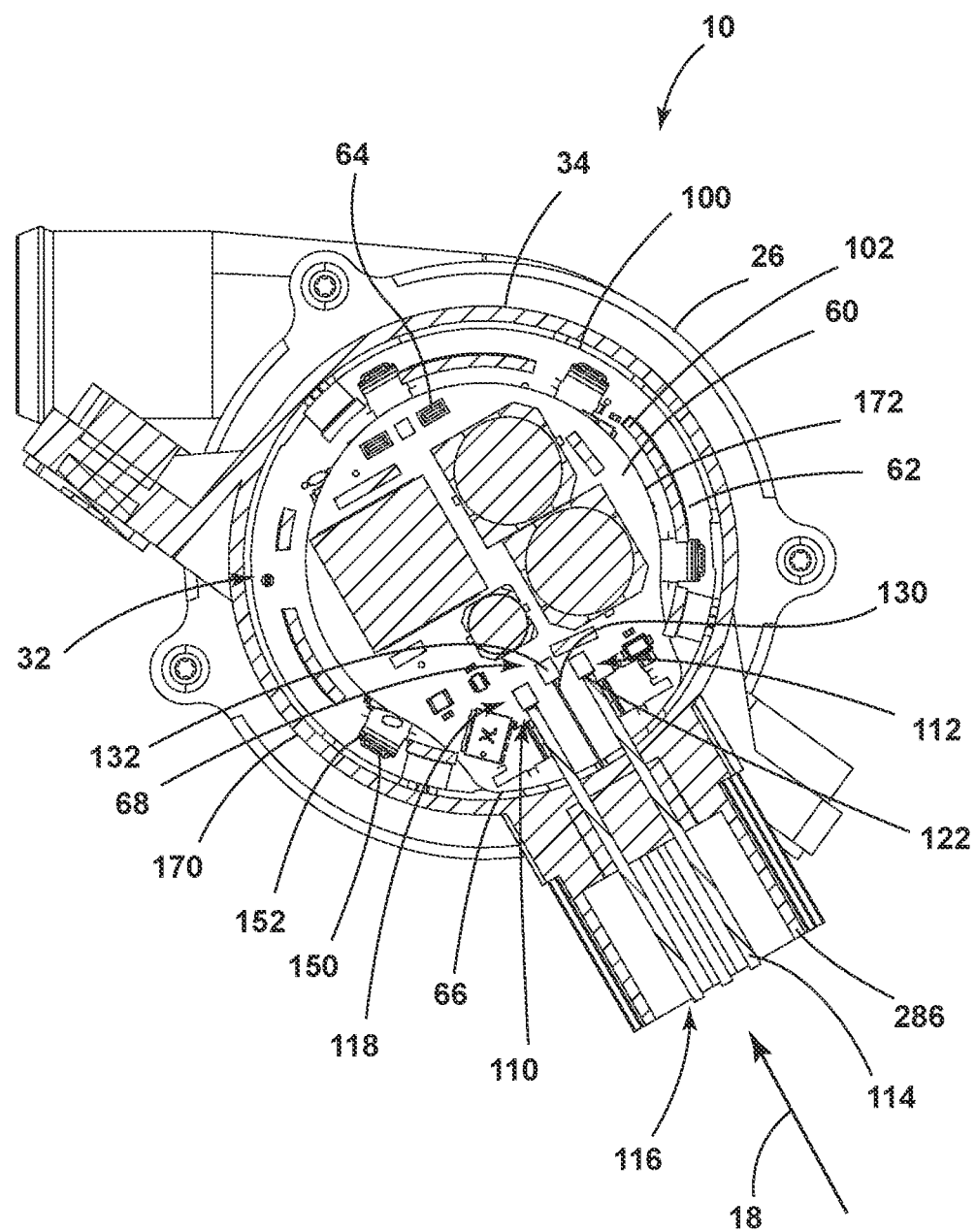
FIG. 18 is a cross sectional view taken trough the blades of the connector and showing engagement with the upper portion of the electrical terminal of the circuit board assembly.
Figure 19:
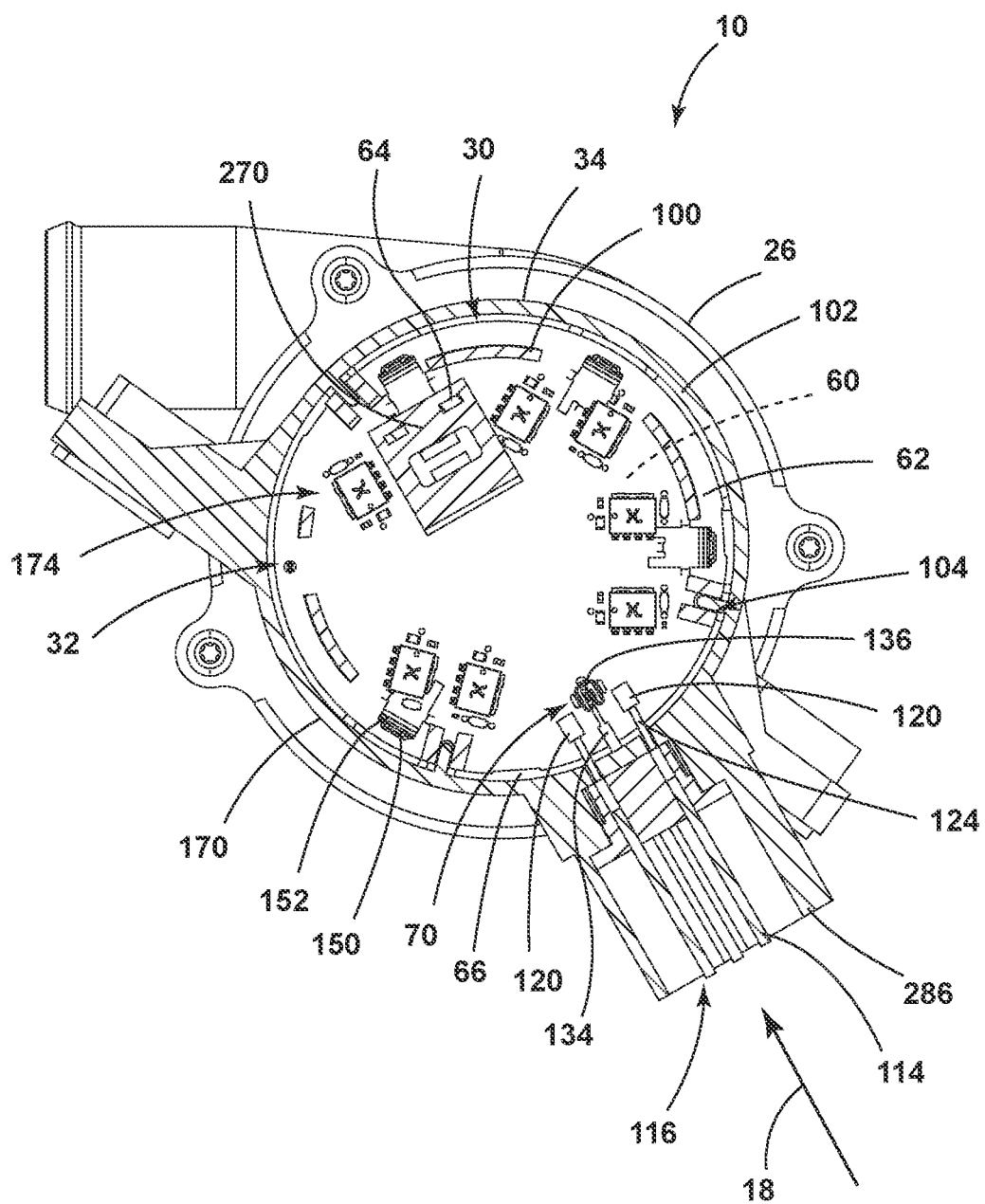
FIG. 19 is a cross sectional view taken trough the blades of the connector and showing engagement with the lower portion of the electrical terminal of the circuit board assembly.
Figure 20:
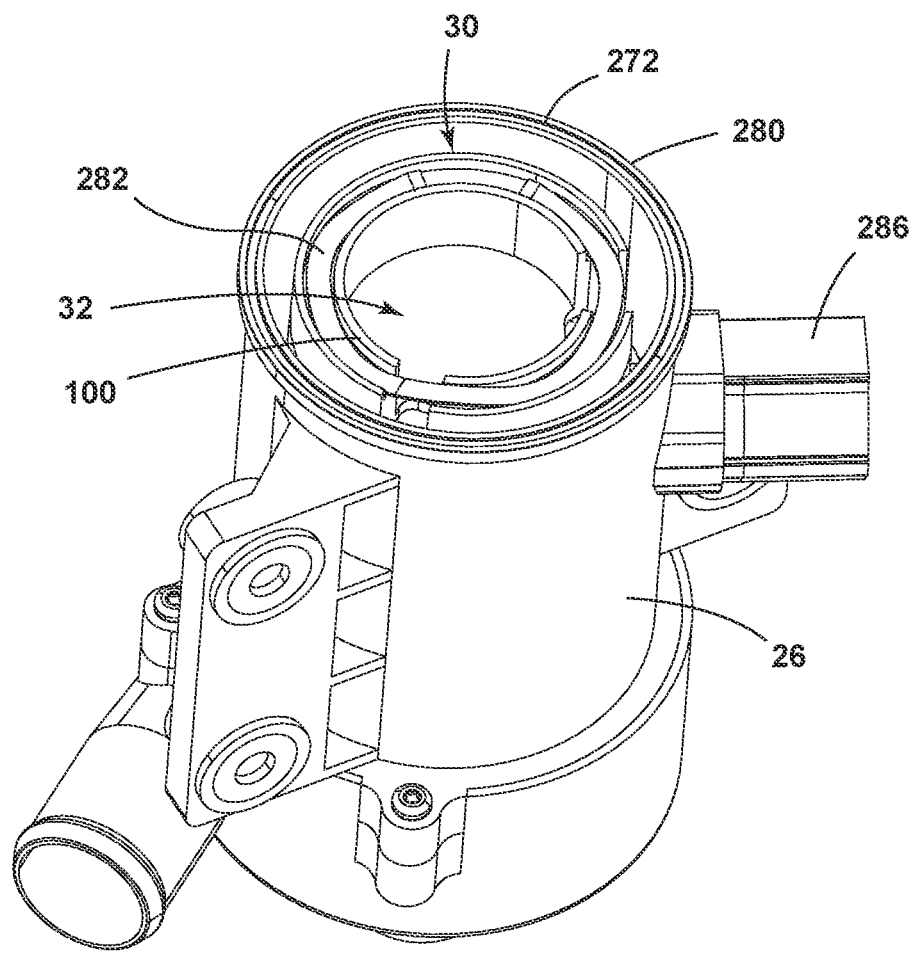
FIG. 20 is a top perspective view showing installation of a wave spring that is positioned between the controller cartridge and a top cap for preloading the controller cartridge within the controller cavity of the housing.
Figure 21:
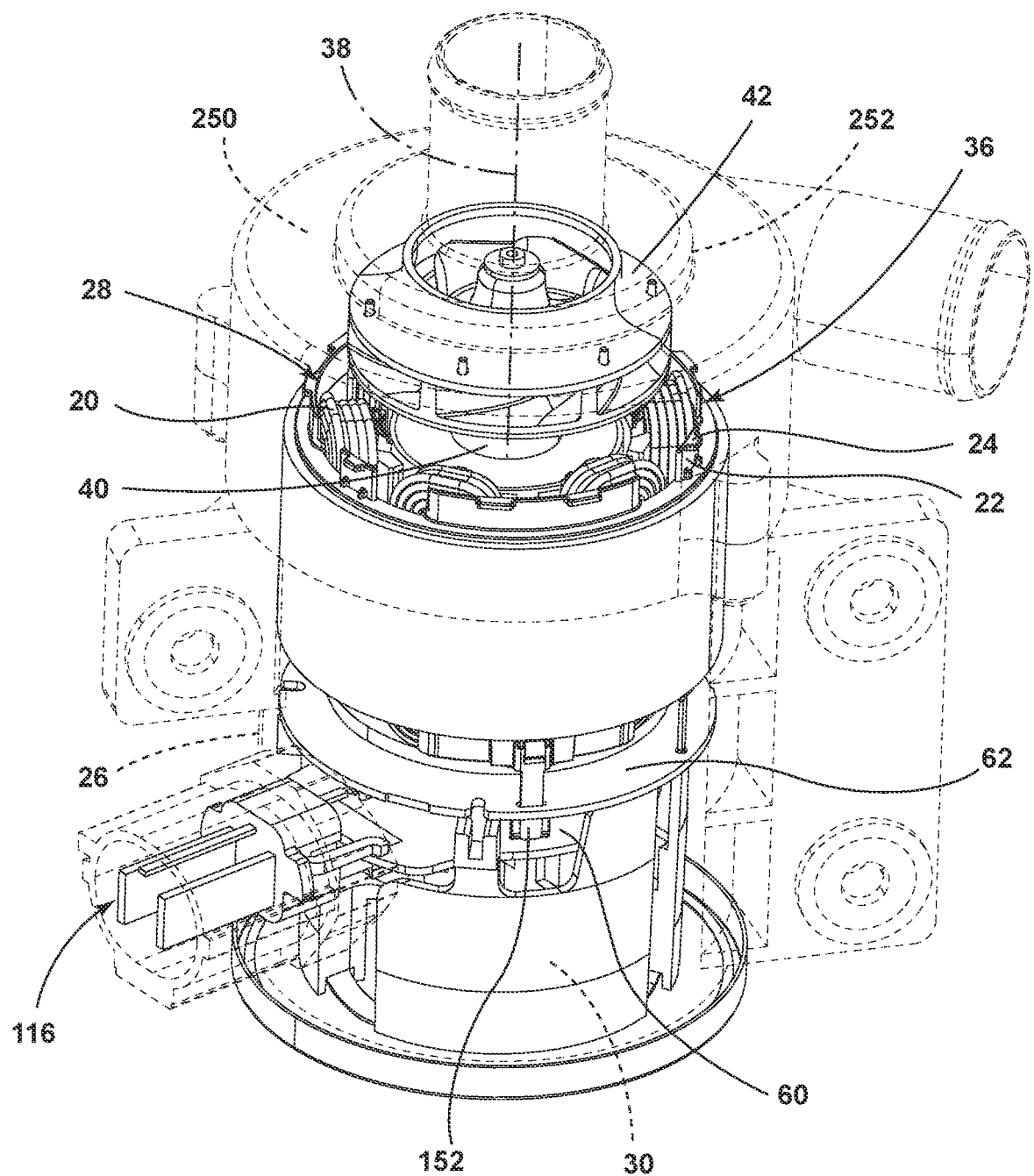
FIG. 21 is a perspective view of the fluid pump of FIG. 1 and showing the housing in dashed line to illustrate the positioning of the internal components of the fluid pump.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a fluid pump that includes a plurality of electrical contacts and a heat-transfer system for receiving a high-powered electrical current that operates a motor assembly for the fluid pump. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-21, reference numeral 10 generally refers to a fluid pump having a fluid inlet 12 and a fluid outlet 14, where process fluid 16 is moved through the fluid pump 10 from a first location, to a second location and then back to the fluid inlet 12 to be recirculated through a particular dedicated assembly. It is contemplated that the fluid pump 10 can be installed within any one of various mechanisms and vehicles. Such vehicles can include conventional combustion engine vehicles, hybrid vehicles or electric vehicles. According to various aspects of the device, the fluid pump 10 described herein is typically used within an electric vehicle, where the electric vehicle provides a large electrical current 18 of high amperage to the fluid pump 10 for operating the various components of the fluid pump 10. The fluid pump 10 includes a motor assembly 20 having a stator 22 with a winding 24. The stator 22 and the winding 24 are covered or encased with an overmold 48 to form a housing 26 having a motor cavity 28 that is disposed within the portion of the overmold 48 that surrounds the stator 22. The housing 26 also includes a controller cavity 30 that receives a controller cartridge 32 having a circuit board assembly 34. A rotor 36 is disposed within the motor cavity 28 and is placed in electromagnetic communication with the stator 22. The rotor 36 is rotationally operable about a rotational axis 38. The rotor 36 includes a drive shaft 40 attached to an impeller 42 for rotating the impeller 42 about the rotational axis 38. As discussed herein, the impeller 42 is used for moving process fluid 16 between the fluid pump 10 and the dedicated assembly via the fluid inlet 12 and fluid outlet 14 of the fluid pump 10. In addition, the operation of the rotor 36 and the impeller 42 serves to circulate a thermal exchange media 44 through the motor cavity 28 for dissipating heat 46 that is generated at least within the circuit board assembly 34.

Referring again to FIGS. 1-21, the fluid pump 10 includes the controller cartridge 32 having a filter circuit board 60 and a main circuit board 62 interconnected by a terminal header 64 to define a multilayer circuit board assembly 34. The circuit board assembly 34 has a primary electrical interface 66 that attaches to the filter circuit board 60. The circuit board assembly 34 also includes at least one data interface that engages at least one of the filter circuit board 60 and the main circuit board 62. In certain aspects, the data interface can include a single data connector. The data interface can also include a first data interface 68 that is attached to the filter circuit board 60 and a second data interface 70 is attached to the main circuit board 62. Using the terminal header 64 that extends between the filter circuit board 60 and the main circuit board 62, electrical power and communications can be transferred between the filter and main circuit boards 60, 62, as needed.

A heat spreader 80 is attached to the housing 26 and is typically positioned between the motor cavity 28 and the controller cavity 30. The heat spreader 80 includes a shaft 82 and a heat sink 84. The shaft 82, typically in the form of a hollow shaft 82, extends into the motor cavity 28 along the rotational axis 38. A hollow section 214 of the shaft 82 defines a portion of the flow path 86 for the thermal exchange media 44. The heat sink 84 draws heat 46 from the circuit board assembly 34 and allows for the transfer of this heat 46 from the controller cavity 30, through the heat sink 84 and into the thermal exchange media 44 that circulates through the motor cavity 28 and the hollow section 214 of the shaft 82 of the heat spreader 80.

Referring now to FIGS. 1-11, the controller cartridge 32 includes the circuit board assembly 34 that is disposed within the controller cavity 30 of the housing 26. The controller cartridge 32 is a pre-assembled cartridge, sometimes referred to as a controller puck that typically includes a support frame 100. The support frame 100 includes locating mechanisms 102 and attachment features 104 that serve to position the filter circuit board 60 and the main circuit board 62 within the support frame 100. The filter circuit board 60, sometimes referred to as a Pi filter board, incorporates capacitors, inductors, and other larger electrical components typically found within printed circuit boards (PCB).

Referring again to FIGS. 1-11, the filter circuit board 60 includes the main electrical terminals 110 and ground terminals 112 of the electrical interface 66 that receive the terminal blades 114 of the connector 116, sometimes referred to herein as a main connector 116 or main header. The connector 116 receives external electrical power and also allows for the transfer of data communications between the controller cartridge 32 and an external controller. As discussed herein, the blades 114 of the connector 116 serve to transfer a large amount (high amperage) of electrical current 18 through the connector 116 and into the circuit board assembly 34. This electrical current 18 can be within a range of from approximately 10 amperes to approximately 50 amperes, and various ranges of amperes therebetween. Typically, the blades 114 will conduct from approximately 30 amperes to approximately 40 amperes from an electrical source and to the circuit board assembly 34. This high level of electrical current 18 to be transferred into the circuit board assembly 34 requires a large cross-sectional area representing the electrical and ground terminals 110, 112. As exemplified herein, multiple electrical terminals 110 and multiple ground terminals 112 provide for the increased contact area and, in turn, the efficient flow of the high-amperage electrical current 18. Accordingly, the plurality of terminal blades 114 are bifurcated to engage opposing sides of the filter circuit board 60. The filter circuit board 60 includes a set of upper sockets 118 and a set of lower sockets 120 that are positioned on opposing sides of the filter circuit board 60. The set of upper sockets 118 and the set of lower sockets 120 each receive an upper portion 122 or lower portion 124 of each blade 114, respectively, of the main connector 116. This increase in the surface area between the blades 114 of the connector 116 and the filter circuit board 60 provides for a more efficient flow of electrical current 18 into the circuit board assembly 34.

In addition to the blades 114 or terminal blades 114, the connector 116 includes separate communications connections, typically two communications connections. The blades 114 and the communications connections are secured together with an insulated body that is typically made of resin to form the structure of the connector 116. The first data interface 68 includes a first communication connector 130 that engages a first communications port 132 of the filter circuit board 60. The second data interface 70, includes a second communications connector 134 that engages a second communications port 136 of the main circuit board 62. As discussed herein, the terminal header 64 allows for a transfer of electrical current 18 and data communications between the filter circuit board 60 and the main circuit board 62. The housing 26 includes a guide interface that guides the insulated body and the various terminal blades 114 and the first and second communications connectors 130, 134 into engagement with the filter circuit board 60.

According to various aspects for the device, the first and second data interfaces 68, 70 can include a primary data connection and an emergency data connection. Using this configuration of the filter circuit board 60, the main circuit board 62 and the various connection terminals for receiving data communications, the connector 116 can engage two separate PCBs of the circuit board assembly 34 within a relatively confined space. In addition, the high-amperage electrical current 18 can be efficiently delivered through the circuit board assembly 34 and between the filter circuit board 60 and the main circuit board 62.

Still referring to FIGS. 1-11, the main circuit board 62 also includes a plurality of terminal sockets 150 that receive corresponding motor terminals 152 from the stator 22. Typically, the stator 22 will include four motor terminals 152 that engage a corresponding set of terminal sockets 150 that are disposed within the main circuit board 62. These motor terminals 152 can be dry-docked within the terminal sockets 150 and then laser welded to define a secure electrical connection between the motor terminals 152 for the stator 22 and the main circuit board 62 of the circuit board assembly 34. These motor terminals 152 and the corresponding terminal sockets 150 are configured to account for at least a portion of the high-amperage electrical current 18 that may be delivered to the stator 22 for operating the rotor 36.

The filter circuit board 60 and a main circuit board 62 are each typically formed using a flame-retardant epoxy resin material, such as FR4 as a preferred exemplary material. In addition, the various circuitry is disposed onto the filter circuit board 60 and main circuit board 62 using SMT (surface mounted technology) electrical sockets. These SMT electrical sockets are formed on the surface of the filter and main circuit boards 60, 62. The SMT processes used and described herein efficiently locate the circuitry and terminal connections that make up the SMT electrical sockets for positioning various components of the circuit board assembly 34. After the SMT electrical sockets are disposed on the materials of the PCBs, the various capacitors, inductors, sockets, terminals and other components of the PCBs can be attached. This attachment can include soldering, laser welding, other attachment methods or mechanical interfaces. In the case of at least the motor terminals 152, use of the SMT processes, the interconnection created between the motor terminals 152 of the stator 22 and the terminal sockets 150 of the circuit board assembly 34 provide for a consistent, repeatable and robust electrical connection. This interconnection provides for the consistent delivery of electrical power to the stator 22 as well as the transfer of data communications between the stator 22 and the circuit board assembly 34.

As discussed herein, the filter circuit board 60 includes upper and lower sockets 118, 120 that receive the bifurcated blades 114 of the connector 116 for the fluid pump 10. Each of these blades 114 includes a contoured section 160 having a central slot 162 that is adapted to extend around the material of the filter circuit board 60 to engage the upper sockets 118 and the lower sockets 120, respectively. As discussed herein, this central slot 162 bifurcates each of the blades 114 to provide an increased surface area of the blades 114 for delivering the substantial electrical current 18 to and through the circuit board assembly 34.

During assembly of the controller cartridge 32, the filter circuit board 60 is typically designed to have access points 170 around the perimeter 172 of the filter circuit board 60. These access points 170 can be created by having the filter circuit board 60 be smaller than the main circuit board 62. Through this configuration, when the controller cartridge 32 is disposed within the controller cavity 30 of the housing 26, access to the terminal sockets 150 that receive the motor terminals 152 is provided around or through the filter circuit board 60. These access points 170 around the filter circuit board 60 of the circuit board assembly 34 provides access to perform laser welding, or other attachment processes, at the connection points between the motor terminals 152 and the terminal sockets 150. Gaps 174 within the support frame 100 are also designed to allow for this access to perform laser welding operations. These access points 170 and gaps 174 can also provide for conventional soldering and other similar welding and adhering attachment processes and methods.

Referring now to FIGS. 2-7 and 12-13, the heat spreader 80 that is positioned between the motor cavity 28 and the controller cavity 30 serves to transfer heat 46 that is built up within the circuit board assembly 34 into the motor cavity 28. This heat 46 is then dissipated through the thermal exchange media 44 and away from the motor cavity 28 to maintain the controller cavity 30 and the circuit board assembly 34 at a particular temperature range. The heat spreader 80 includes a heat sink 84 that is typically in the form of an thermally conductive material, such as an aluminum member. The heat sink 84 is attached to the housing 26 adjacent the motor cavity 28 and the controller cavity 30. The shaft 82 of the heat spreader 80 extends from this heat sink 84 and into the motor cavity 28. A thermal gap interface material 190 is disposed on the heat sink 84 and engages a portion of the circuit board assembly 34, typically the main circuit board 62, for providing a consistent thermal path through which heat 46 can be transferred into the heat sink 84.

During operation of the motor assembly 20, the rotor 36 operates the impeller 42 and delivers a process fluid 16 into the fluid inlet 12, through the impeller 42 and to a fluid outlet 14. The operation of the motor assembly 20 generates pressure and suction that provides for the movement of process fluid 16 through the impeller 42. A portion of this pressure and suction is utilized within the motor cavity 28 for circulating a thermal exchange media 44 within an area defined between the stator 22 and the rotor 36 and through the hollow section 214 of the shaft 82 of the heat spreader 80. Through this configuration, the thermal exchange media 44 is moved around the overmold 48 of the rotor 36 and within the overmolded stator 22 and is directed to a base 212 of the heat sink 84 for further recirculation. Fluid slots 210 are disposed within the base 212 of the heat sink 84 to allow the thermal exchange media 44 to be directed into a hollow section 214 of the shaft 82. This hollow section 214 of the shaft 82 extends the length of the shaft 82 and directs the thermal exchange media 44 to the opposing suction side of the fluid pump 10 to be recirculated outward and around the rotor 36 and between the rotor 36 and the stator 22 within the motor cavity 28. It is contemplated that this thermal exchange media 44 can be in a form of any one or more of various thermal exchange materials, such as glycol, water, oil-based material, or other similar thermal exchange media 44. Typically, the thermal exchange media 44 is in a liquid form, although the thermal exchange media 44 can also be in a gaseous form or can be a phase change material that can be in either a liquid or gaseous form, or both.

Referring again to FIGS. 2-7 and 12-13, the positioning of the heat sink 84 of the heat spreader 80 provides for an efficient movement of heat 46 from the circuit board assembly 34 and the controller cavity 30 and into the thermal exchange media 44 that is circulated through the motor cavity 28. This is done to maintain the circuit board assembly 34 and the controller cavity 30 in a consistent range of temperatures that is typically below approximately 160° C. and more typically below approximately 150° C. In certain aspects of the device, the thermal exchange media 44 is glycol, which can have a maximum temperature of approximately 110° C. This temperature gradient provides for consistent thermal exchange between the circuit board assembly 34, the thermal gap interface material 190, the heat sink 84 of the heat spreader 80 and the thermal exchange media 44. This thermal exchange media 44 is typically circulated only through the motor cavity 28 and the transferred heat 46 is dissipated as the thermal exchange media 44 circulates through the motor cavity 28.

In certain aspects of the device, it is contemplated that the thermal exchange media 44 can be delivered to an external location to provide for an alternative mechanism for dissipating heat 46 from the controller cavity 30 and the fluid pump 10 in general.

Studies have shown through thermal modeling that the positioning of the heat sink 84 and shaft 82 of the heat spreader 80 relative to the circuit board assembly 34, as generally exemplified in the FIGS. 2-13, provides for a decrease of approximately 20° C. to approximately 40° C. in the temperature of the circuit board assembly 34. This consistent decrease in temperature provides for the use of FR4 material within the material of the PCBs of the circuit board assembly 34. This configuration of the device provides for the use of high amperage currents within the circuit board assembly 34 while also using cost-effective FR4 material to manufacture PCBs of the circuit board assembly 34. The thermal exchange media 44 efficiently delivers heat 46 away from the circuit board assembly 34 to maintain a consistent temperature within the controller cavity 30.

Referring again to FIGS. 2-7 and 12-13, the shaft 82 of the heat spreader 80 typically extends through the rotor 36 and provides for rotational interface around which the rotor 36 and the drive shaft 40 can operate relative to the rotational axis 38 of the fluid pump 10. Additionally, the shaft 82 includes the hollow section 214 that delivers the thermal exchange media 44 between a pressure side of the motor cavity 28 for the fluid pump 10 and a suction side of the motor cavity 28 for the fluid pump 10. The direction of the thermal exchange media 44 can change depending upon the particular design of the fluid pump 10 and the motor cavity 28. Accordingly, the thermal exchange media 44 can operate from the impeller side of the motor cavity 28, through the shaft 82 and then out of the fluid slot 210 defined within the base 212 of the heat spreader 80. The thermal exchange media 44 can also operate in the opposite direction depending upon the design of the fluid pump 10.

According to various aspects of the device, as described herein, and as illustrated at least in FIGS. 1-21, the assembly of the fluid pump 10 provides for an efficient and repeatable manufacturing process. This manufacturing process includes separate manufacture of the individual components that are assembled to form the fluid pump 10. By way of example, and not limitation, the controller cartridge 32 can be manufactured in one location, while the housing 26 and motor components of the fluid pump 10 can be manufactured at a separate location. The impeller 42 and the fluid end cap 254 can also be manufactured in a separate location where these components are assembled in an efficient and expedient manner. To assist in this assembly, the various feedback mechanisms, in the form of locating mechanisms 102 and attachment features 104 of the housing 26 and the support frame 100, provide an assembly worker with indication that the components are assembled in the proper orientation and order.

By way of example, and not limitation, the motor terminals 152 are not symmetrically positioned about the rotational axis 38 of the stator 22. Rather, they are positioned at particular angles such that attachment of these motor terminals 152 with the terminal sockets 150 of the circuit board assembly 34 can only be accomplished in a single rotational orientation of the circuit board assembly 34 relative to the housing 26. Attachment of the circuit board assembly 34 with the housing 26 provides a visual, and in certain instances, auditory and haptic feedback regarding the proper installation of these components. In addition, during manufacture of the controller cartridge 32, various interface features within the support frame 100 provide for an accurate positioning of the filter circuit board 60 and the main circuit board 62 within the support frame 100. Once located within the support frame 100, these components can be attached together to provide a final configuration of the controller cartridge 32 that can be conveniently installed within the controller cavity 30 of the housing 26.

Referring now to FIGS. 2-5 and 14-15, during assembly of the motor assembly 20, the stator 22 is formed from a series of stacked or spirally would laminations. These laminations can form the entire stator 22 or can form sections of the stator 22 that are attached together to form the core and teeth 230 of the stator 22. After forming the wound stator 22, windings 24 are disposed around teeth 230 of the stator 22 and rotor magnets 232 are positioned within a rotor frame 234 to form the structure of the rotor 36. The rotor frame 234 can be made of a stack of laminations that form pockets that receive the rotor magnets 232. Each of these pump components can be separately covered or encased in an overmold 48 to form the housing 26 and the motor cavity 28, as well as the rotor 36 having the overmold 48 that can be positioned within the motor cavity 28. The impeller 42 can then be attached to the rotor 36 so that operation of the rotor 36 within the stator 22 causes rotation of the impeller 42 for moving the process fluid 16 from the fluid inlet 12 to the fluid outlet 14 of the fluid pump 10.

As exemplified in FIGS. 2-5 and 17-21, the overmold 48 of the housing 26 includes the various locating features and attachment mechanisms that are integrally formed within the material of the overmold 48 that surrounds the stator 22. In addition to the connection points between the motor terminals 152 and the terminal sockets 150 of the circuit board assembly 34, an impeller end 250 of the housing 26 includes a channel 252 that defines a portion of the fluid path between the fluid inlet 12 and the fluid outlet 14. Through this configuration, the exact positioning orientation of the fluid end cap 254, or volute, having the fluid inlet 12 and fluid outlet 14 can be ensured through positive feedback in the form of visual, auditory and haptic cues that are provided to the assembly worker. Various seals and gaskets are also positioned between the controller cavity 30 and the motor cavity 28 to ensure that the thermal exchange media 44 is maintained separate from the controller cavity 30. In addition, in certain aspects of the device, the portion of the motor cavity 28 housing the impeller 42 can be sealed from the remainder of the motor cavity 28 housing the rotor 36. This sealed configuration can be used to ensure that the thermal exchange media 44 surrounding the rotor 36 and which is moved through the heat spreader 80 is maintained separate from the process fluid 16 that is moved through the fluid end cap 254 by the impeller 42. Accordingly, the thermal exchange media 44 is contained within the motor cavity 28 to provide for the thermal exchange function for drawing excess heat 46 away from the circuit board assembly 34.

Referring now to FIGS. 2-5, 8-10 and 16-20, during assembly of the controller cartridge 32, as discussed herein, the filter circuit board 60 and the main circuit board 62 are interconnected via the terminal header 64. This terminal header 64 extends between the filter circuit board 60 and the main circuit board 62. This terminal header 64 can be positioned in a linear path between the filter circuit board 60 and the main circuit board 62 or can move in a more angled path to provide for efficient flow of data connections and electrical current 18 between the filter circuit board 60 and the main circuit board 62. At least one insulator 270 can be positioned around the terminal header 64 to minimize electrical and electromagnetic interaction between electrical fields that may be produced through the large amounts of electrical current 18 delivered through the circuit board assembly 34. As discussed herein, the filter circuit board 60 is configured to be a different size and shape than the main circuit board 62 to allow for access to the main circuit board 62 for laser welding and other connection operations for manufacture of the controller cartridge 32. The controller cartridge 32 is then disposed within the controller cavity 30 of the housing 26 and is engaged to the motor terminals 152 via the terminal sockets 150 to the main circuit board 62.

Referring now to FIGS. 4-5 and 16-21, the controller cartridge 32 includes a circumferential channel 280 that receives a wave spring 282 that is installed at the end of the controller cartridge 32. This wave spring 282 engages the top cap 284 and serves to preload the controller cartridge 32 to position the controller cartridge 32 relative to the connector 116 and the connector aperture 286. Once positioned within the controller cavity 30, the connectors 116 having the pair of blades 114 and pair of data connections can be installed and attached to the various contacts and terminals within the filter circuit board 60 and main circuit board 62. The wave spring 282 ensures that the controller cartridge 32 is secured against the various locating mechanisms 102 within the controller cavity 30 of the housing 26 to position the filter circuit board 60 and the main circuit board 62 relative to a connector aperture 286. Once the controller cartridge 32 is aligned with the connector aperture 286, the various connectors 116 can be installed through the connector aperture 286 and engaged with the filter circuit board 60 and the main circuit board 62. An O-ring seal 272 is also positioned at an edge of the housing 26 to seal against the top cap 284 to ensure that fluid does not infiltrate within the controller cavity 30.

Using the thermal exchange media 44 included within the motor housing 26, heat 46 can be extracted from the controller cavity 30 and from the fluid pump 10 as a whole. By extracting heat 46 from the fluid pump 10, a wider range of materials can be used within the fluid pump 10 that may have a greater tolerance to the temperature ranges described herein. The wider range of available materials that can be used within the fluid pump 10 can include more readily available or more cost effective materials. By way of example, and not limitation, the material of the PCBs of the circuit board assembly 34 can be made of FR4 material. Additionally, the housing 26 can be made from PPS (polyphenylene sulfide). Other polymers can be utilized within the fluid pump 10 due to the decreased temperature within the components of the fluid pump 10 as the result of the thermal exchange media 44 that is moved through the motor cavity 28.

As discussed herein, the fluid pump 10 of the instant application operates using the very high electrical current 18 having a large amperage. To account for this large electrical current 18 and high amperage, multiple terminals are included within the filter circuit board 60 for receiving this electrical current 18 from the connectors 116 and delivering this current to the main circuit board 62 and then to the stator 22 for operating various components of the motor assembly 20 and the fluid pump 10. Data connections are transferred to each of the filter circuit board 60 and the main circuit board 62 so that data can be delivered directly to the capacitors and inductors of the filter circuit board 60 as well as the terminal sockets 150 that are disposed within the main circuit board 62.

Referring again to FIGS. 4-5 and 16-21, installation of the top cap 284 engages the wave spring 282 to preload the controller cartridge 32 to be biased against retaining components defined within the controller housing 26. The top cap 284 is then crimped to position the electrical components of the circuit board assembly 34 in a proper axial position to receive the blades 114 and the data connections of the connector 116. These upper and lower sockets 118, 120 can be in the form of molded headers that are electrically connected to form the upper and lower sockets 118, 120 that are mounted on the filter circuit board 60 via the SMT electrical sockets. These molded headers can be sealingly engaged to the housing 26 and within the controller cavity 30. The controller cartridge 32 includes a support frame 100 that is typically made of resin material that supports the filter circuit board 60 and the main circuit board 62 within the controller cartridge 32 and within the controller cavity 30 of the housing 26. As discussed herein, the support frame 100 includes features for securing the large capacitors and conductors for robustness against vibration testing and operational vibrations that may be experienced by the fluid pump 10 during use. The support frame 100 also includes a pocket in the form of the circumferential channel 280 for receiving the wave spring 282 that preloads the controller cartridge 32. As discussed herein, this pocket receives the wave spring 282 that engages the top cap 284 to preload the controller cartridge 32 within the controller housing 26.

Referring again to FIGS. 1-21, the main circuit board 62 of the motor assembly 20 receives the motor terminals 152 that extend from the stator 22 and through portions of the housing 26 and extend into the controller cavity 30. At the same time, the electrical terminals 110 of the filter circuit board 60 receive electrical current 18 from the blades 114 of the connector 116 via the terminal header 64 and the upper and lower sockets 118, 120 that are defined on the opposing sides of the filter circuit board 60. Various terminals can be silver or gold plated to prevent corrosion. Typically, the data connections can also be plated in this manner to prevent corrosion. In certain aspects of the device, connections that receive a larger electrical current 18 may not need to be plated in this manner as the large magnitude electrical current 18 can maintain these connections free of corrosion due to the large current flowing therethrough.

As exemplified in FIGS. 1-21, the fluid pump 10 includes the overmold 48 that extends around the winding 24 of the stator 22 that can be made from resin, such as PPS. This is used to form the motor cavity 28 that receives the rotor 36 for operating the fluid pump 10. An isolator piece, in the form of the heat sink 84 of the heat spreader 80 is made of the thermally conductive material, typically in the form of an aluminum member that can be adhered, welded, or otherwise connected to the housing 26 or to the base 212 for the heat spreader 80. This heat sink 84 is placed between the motor cavity 28 and the controller cavity 30 to create a barrier between the two cavities with a radial seal interface between the overmold 48 of the stator 22 and the isolator piece for heat sink 84. The heat sink 84 creates a thermal path between the dry controller cavity 30 and the wet motor cavity 28 having the thermal exchange media 44 that circulates therethrough. This thermal exchange media 44 is pumped through the motor cavity 28 through the use of at least a portion of the pressure and suction generated during operation of the impeller 42 for the fluid pump 10. This shaft 82 of the heat spreader 80 is also utilized to provide for the circulation of the thermal exchange media 44 through the motor cavity 28.

Using the various components of the motor assembly 20, including at least the circuit board assembly 34 and the heat spreader 80, large electrical currents 18 can be delivered to the circuit board assembly 34 of the fluid pump 10, without increasing the temperature of the controller cavity 30 beyond a failure state of many materials. Accordingly, a wider selection of less heat resistant materials can be utilized within the circuit board assembly 34 and the fluid pump 10 generally. In addition, the use of a heat spreader 80 provides for the efficient transmission of heat 46 from the circuit board assembly 34 and into the thermal exchange media 44 for dispersion away from the fluid pump 10. Also, the manufacture of the separate components, in the form of a housing 26, the controller cartridge 32 and the heat spreader 80 can be separately manufactured and assembled in a particular location from an efficient manufacturing process. The use of this configuration provides for a robust mechanical and electrical system for the fluid pump 10 that can be utilized in a highly demanding and high magnitude electrical current setting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor assembly comprising:
   a housing having a motor cavity;
   a stator disposed within the housing;
   a rotor that rotates within the stator and within the motor cavity about a rotational axis, the rotor attached to a fluid pump that directs a fluid from a fluid inlet of the housing and to a fluid outlet of the housing;
   a controller coupled with the stator having a filter circuit board and a main circuit board that are interconnected at a terminal header to define a multilayer circuit board assembly, wherein the circuit board assembly has an electrical interface and a data interface attached to at least one of the filter circuit board and the main circuit board; and a heat spreader that is attached to the housing, the heat spreader having a heat sink and a shaft that extends into the motor cavity along the rotational axis, wherein the heat sink draws heat from the circuit board assembly and transfers the heat to a thermal exchange media that is contained within the motor cavity, the thermal exchange media being recirculated through the motor cavity and the shaft of the heat spreader, and wherein the thermal exchange media is separated from the fluid moved by the fluid pump from the fluid inlet to the fluid outlet.

2. The motor assembly of claim 1, wherein the shaft of the heat spreader is a hollow shaft through which the thermal exchange media is delivered from the circuit board assembly and through the motor cavity.

3. The motor assembly of claim 1, wherein the controller is positioned within a controller cavity that is adjacent to the motor cavity.

4. The motor assembly of claim 3, wherein the heat sink is an aluminum member that is disposed adjacent to the motor cavity and the controller cavity.

5. The motor assembly of claim 1, wherein the thermal exchange media is glycol.

6. The motor assembly of claim 1, further comprising a thermal gap interface material that is disposed between the heat sink and the main circuit board.

7. The motor assembly of claim 1, wherein the main circuit board and the filter circuit board are interconnected at the terminal header to define the multilayer circuit board assembly.

8. The motor assembly of claim 1, wherein the multilayer circuit board assembly is incorporated within a pre-assembled cartridge, and wherein the multilayer circuit board assembly includes electrical surface mounted technology (SMT) electrical sockets.

9. The motor assembly of claim 8, wherein the SMT electrical sockets receive motor terminals of the stator, wherein the SMT electrical sockets place the motor terminals in electrical communication with the main circuit board.

10. The motor assembly of claim 1, wherein the shaft of the heat spreader extends through the rotor and along the rotational axis of the rotor, and wherein a drive shaft of the rotor is disposed around the shaft of the heat spreader.

11. The motor assembly of claim 3, wherein the heat spreader includes a base from which the shaft extends, and wherein the base includes a fluid slot through which the thermal exchange media travels between the controller cavity and the shaft.

12. A motor assembly comprising:
a wound stator that is overmolded to form a housing having a motor cavity within the stator;
a rotor that rotates within the motor cavity about a rotational axis; and
a controller having a filter circuit board and a main circuit board that are interconnected at a terminal header to define a multilayer circuit board assembly containing electrical surface mount technology electrical sockets for attaching motor terminals in electrical communication with the main circuit board, wherein the terminal header includes at least one insulator to limit electromagnetic communication between the filter circuit board and the main circuit board within areas outside of the terminal header, and wherein an electrical current delivered through the multilayer circuit board assembly is from approximately 10 amperes to approximately 50 amperes.

13. The motor assembly of claim 12, wherein a connector for the controller includes electrical terminals that engage an upper socket that receives an upper portion of a blade for the connector and a lower socket that receives a lower portion of the blade.

14. The motor assembly of claim 13, wherein the connector includes a first data interface that engages a first communications port of the filter circuit board, and wherein the connector includes a second data interface that engages a second communications port of the main circuit board.

15. The motor assembly of claim 12, wherein the multilayer circuit board assembly is a pre-assembled cartridge that is attached to the housing and the wound stator.

16. A motor assembly comprising:
a wound stator that is overmolded to form a housing having a motor;
a rotor that rotates within a motor cavity about a rotational axis; and
a heat spreader that is attached to the housing, the heat spreader having a heat sink and a hollow shaft that extends into the motor cavity defining the rotational axis, wherein the heat sink draws heat from a circuit board assembly and transfers the heat to a thermal exchange media that is contained within the motor cavity and recirculated through the motor cavity and the hollow shaft.

17. The motor assembly of claim 16, further comprising:
a controller coupled with the stator having a filter circuit board and a main circuit board that are interconnected at a terminal header to define the circuit board assembly, wherein the circuit board assembly has an electrical interface and at least one data interface that is attached to at least one of the filter circuit board and the main circuit board.

18. The motor assembly of claim 17, wherein the controller is positioned within a controller cavity that is separated from and in thermal communication with the motor cavity.

19. The motor assembly of claim 1, wherein the terminal header includes at least one insulator to limit electromagnetic communication between the filter circuit board and the main circuit board within areas outside of the terminal header, and wherein an electrical current delivered through the multilayer circuit board assembly is from approximately 10 amperes to approximately 50 amperes.

20. The motor assembly of claim 17, wherein the terminal header includes at least one insulator to limit electromagnetic communication between the filter circuit board and the main circuit board within areas outside of the terminal header, and wherein an electrical current delivered through the circuit board assembly is from approximately 10 amperes to approximately 50 amperes.

* * * * *